US011348066B2

(12) United States Patent
Galluzzo et al.

(10) Patent No.: US 11,348,066 B2
(45) Date of Patent: May 31, 2022

(54) SYSTEM AND METHOD FOR PIECE PICKING OR PUT-AWAY WITH A MOBILE MANIPULATION ROBOT

(71) Applicant: IAM ROBOTICS, LLC, Sewickley, PA (US)

(72) Inventors: Thomas Galluzzo, Gibsonia, PA (US); Vladimir Altman, Pittsburgh, PA (US); John Cameron, Wexford, PA (US); Chris Grill, Monroeville, PA (US); Mark Renfrew, Pittsburgh, PA (US); Yash Manian, Pittsburgh, PA (US)

(73) Assignee: IAM Robotics, LLC, Pittsburgh, PA (US)

( * ) Notice: Subject to any disclaimer, the term of this patent is extended or adjusted under 35 U.S.C. 154(b) by 102 days.

(21) Appl. No.: 16/841,572

(22) Filed: Apr. 6, 2020

(65) Prior Publication Data
US 2020/0242544 A1 Jul. 30, 2020

Related U.S. Application Data

(63) Continuation-in-part of application No. 16/207,362, filed on Dec. 3, 2018, now Pat. No. 10,867,279, (Continued)

(51) Int. Cl.
*G06Q 10/08* (2012.01)
*B25J 9/00* (2006.01)
(Continued)

(52) U.S. Cl.
CPC ............ *G06Q 10/087* (2013.01); *B25J 5/007* (2013.01); *B25J 9/0093* (2013.01); *B25J 9/162* (2013.01);
(Continued)

(58) Field of Classification Search
CPC combination set(s) only.
See application file for complete search history.

(56) References Cited

U.S. PATENT DOCUMENTS 5,413,454 A 5/1995 Movsesian
6,328,523 B1 12/2001 Watanabe et al.
(Continued)

FOREIGN PATENT DOCUMENTS

EP 0591845 A1 4/1994
EP 1621296 A1 2/2006
WO 2014025270 A1 2/2014

*Primary Examiner* — Kyle O Logan
(74) *Attorney, Agent, or Firm* — Dentons Cohen & Grigsby P.C.

(57) ABSTRACT

A method and system for picking or put-away within a logistics facility. The system includes a central server and at least one mobile manipulation robot. The central server is configured to communicate with the robots to send and receive picking data which includes a unique identification for each item to be picked, a location within the logistics facility of the items to be picked, and a route for the robot to take within the logistics facility. The robots can then autonomously navigate and position themselves within the logistics facility by recognition of landmarks by at least one of a plurality of sensors. The sensors also provide signals related to detection, identification, and location of a item to be picked or put-away, and processors on the robots analyze the sensor information to generate movements of a unique articulated arm and end effector on the robot to pick or put-away the item.

14 Claims, 10 Drawing Sheets

Related U.S. Application Data which is a continuation of application No. 15/947,921, filed on Apr. 9, 2018, now Pat. No. 10,147,069, which is a continuation of application No. 15/728,080, filed on Oct. 9, 2017, now Pat. No. 9,940,604, which is a continuation of application No. 14/340,896, filed on Jul. 25, 2014, now Pat. No. 9,785,911.

(60) Provisional application No. 62/987,084, filed on Mar. 9, 2020, provisional application No. 62/829,705, filed on Apr. 5, 2019, provisional application No. 61/858,590, filed on Jul. 25, 2013.

(51) Int. Cl.
| | | |
|---|---|---|
| *B25J 9/16* | (2006.01) | |
| *B25J 11/00* | (2006.01) | |
| *B25J 15/00* | (2006.01) | |
| *B25J 15/06* | (2006.01) | |
| *B25J 19/02* | (2006.01) | |
| *B60P 1/54* | (2006.01) | |
| *B65G 1/137* | (2006.01) | |
| *G05D 1/00* | (2006.01) | |
| *G05D 1/02* | (2020.01) | |
| *B25J 5/00* | (2006.01) | |

(52) U.S. Cl.
CPC .......... *B25J 9/1692* (2013.01); *B25J 11/00* (2013.01); *B25J 15/0028* (2013.01); *B25J 15/0085* (2013.01); *B25J 15/06* (2013.01); *B25J 15/0608* (2013.01); *B25J 15/0616* (2013.01); *B25J 19/021* (2013.01); *B60P 1/5423* (2013.01); *B65G 1/1373* (2013.01); *B65G 1/1375* (2013.01); *G05D 1/0011* (2013.01); *G05D 1/0088* (2013.01); *G05D 1/0248* (2013.01); *B65G 2209/04* (2013.01); *G05B 2219/37008* (2013.01); *G05B 2219/39441* (2013.01); *G05B 2219/40298* (2013.01); *G05B 2219/40543* (2013.01); *G05B 2219/40564* (2013.01); *G05B 2219/45063* (2013.01); *G05D 2201/0216* (2013.01); *Y10S 901/01* (2013.01); *Y10S 901/02* (2013.01); *Y10S 901/31* (2013.01); *Y10S 901/40* (2013.01); *Y10S 901/47* (2013.01)

(56) References Cited

U.S. PATENT DOCUMENTS

| | | | |
|---|---|---|---|
| 6,626,632 B2 | 9/2003 | Guenzi et al. | |
| 7,066,291 B2 | 6/2006 | Martins et al. | |
| 7,153,085 B2 | 12/2006 | Clark et al. | |
| 7,332,890 B2 | 2/2008 | Cohen et al. | |
| 7,693,757 B2 | 4/2010 | Zimmerman | |
| 7,751,928 B1 * | 7/2010 | Antony | G06Q 10/087 700/214 |
| 7,765,780 B2 | 8/2010 | Koselka et al. | |
| 7,854,108 B2 | 12/2010 | Koselka et al. | |
| 7,894,932 B2 | 2/2011 | Mountz et al. | |
| 7,894,933 B2 | 2/2011 | Mountz et al. | |
| 7,894,939 B2 | 2/2011 | Zini et al. | |
| 7,920,962 B2 | 4/2011 | D'Andrea et al. | |
| 7,912,574 B2 | 5/2011 | Wurman et al. | |
| 7,991,505 B2 | 8/2011 | Lert, Jr. et al. | |
| 7,996,109 B2 | 8/2011 | Zini et al. | |
| 8,010,230 B2 | 8/2011 | Zini et al. | |
| 8,170,711 B2 | 5/2012 | D'Andrea et al. | |
| 8,220,710 B2 | 7/2012 | Hoffman et al. | |
| 8,265,873 B2 | 9/2012 | D'Andrea et al. | |
| 8,280,547 B2 | 10/2012 | D'Andrea et al. | |
| 8,315,736 B2 | 11/2012 | Kalbavi et al. | |
| 8,381,501 B2 | 2/2013 | Koselka et al. | |
| 8,412,400 B2 | 4/2013 | D'Andrea et al. | |
| 8,467,898 B2 | 6/2013 | Cardoni | |
| 8,483,869 B2 | 7/2013 | Wurman et al. | |
| 8,538,692 B2 | 9/2013 | Wurman et al. | |
| 8,594,834 B1 | 11/2013 | Clark et al. | |
| 8,606,392 B2 | 12/2013 | Wurman et al. | |
| 8,626,335 B2 | 1/2014 | Wurman et al. | |
| 8,639,382 B1 | 1/2014 | Clark et al. | |
| 8,718,814 B1 | 5/2014 | Clark et al. | |
| 8,725,286 B2 | 5/2014 | D'Andrea et al. | |
| 9,174,758 B1 | 11/2015 | Rowley | |
| 9,758,305 B2 | 9/2017 | Johnson et al. | |
| 9,776,324 B1 | 10/2017 | Johnson et al. | |
| 10,001,768 B2 | 6/2018 | Johnson et al. | |
| 10,040,194 B1 | 8/2018 | Theobald | |
| 10,048,691 B2 | 8/2018 | Reiff et al. | |
| 2004/0093650 A1 | 5/2004 | Martins | |
| 2004/0030611 A1 | 12/2004 | Byrne | |
| 2005/0226711 A1 | 10/2005 | Bernd et al. | |
| 2006/0072988 A1 | 4/2006 | Kazuo et al. | |
| 2007/0119123 A1 | 5/2007 | Clark et al. | |
| 2007/0255453 A1 | 11/2007 | Brogardh | |
| 2008/0077511 A1 | 3/2008 | Zimmerman | |
| 2010/0155156 A1 | 6/2010 | Finkelstein | |
| 2011/0163160 A1 | 7/2011 | Zini et al. | |
| 2011/0223001 A1 | 9/2011 | Martinez et al. | |
| 2012/0029697 A1 | 2/2012 | Ota et al. | |
| 2012/0191272 A1 | 7/2012 | Andersen | |
| 2012/0321423 A1 | 12/2012 | MacKnight | |
| 2012/0323358 A1 | 12/2012 | Izumi et al. | |
| 2012/0328395 A1 | 12/2012 | Jacobsen | |
| 2012/0330458 A1 | 12/2012 | Weiss | |
| 2013/0096713 A1 | 4/2013 | Takizawa | |
| 2013/0226340 A1 | 8/2013 | Buchstab | |
| 2013/0245811 A1 | 9/2013 | Holmes | |
| 2013/0317642 A1 * | 11/2013 | Asaria | G06Q 10/08 700/216 |
| 2014/0017048 A1 | 1/2014 | Mattern | |
| 2014/0025198 A1 * | 1/2014 | Mattern | B25J 9/1697 700/228 |
| 2014/0046512 A1 | 2/2014 | Villamar | |
| 2014/0074342 A1 * | 3/2014 | Wong | B66F 9/0755 701/26 |
| 2014/0081445 A1 | 3/2014 | Villamar | |
| 2014/0214196 A1 | 7/2014 | Worsley | |
| 2014/0088758 A1 | 8/2014 | Lert et al. | |
| 2014/0222191 A1 | 8/2014 | Blumenau | |
| 2014/0277691 A1 | 9/2014 | Jacobus | |
| 2017/0183157 A9 | 6/2017 | Massey | |
| 2017/0336780 A1 | 11/2017 | Wise et al. | |
| 2018/0139593 A1 | 5/2018 | Chun et al. | |

\* cited by examiner

SYSTEM AND METHOD FOR PIECE PICKING OR PUT-AWAY WITH A MOBILE MANIPULATION ROBOT

RELATED APPLICATIONS

This application is a continuation-in-part of U.S. patent application Ser. No. 16/207,362, filed on Dec. 3, 2018, which is a continuation of U.S. patent application Ser. No. 15/947,921, filed on Apr. 9, 2018, now U.S. Pat. No. 10,147,069, which is a continuation of U.S. patent application Ser. No. 15/728,080, filed on Oct. 9, 2017, now U.S. Pat. No. 9,904,604, which is a continuation of U.S. patent application Ser. No. 14/340,896, filed on Jul. 25, 2014, now U.S. Pat. No. 9,785,911, which claims the benefit under 35 U.S.C. § 119(e) of prior U.S. Provisional Patent Application Ser. No. 61/858,590, filed on Jul. 25, 2013, the entire contents of which are hereby incorporated by reference. This application also claims the benefit under 35 U.S.C. § 119(e) of prior U.S. Provisional Application Ser. No. 62/829,705, filed on Apr. 5, 2019, and U.S. Provisional Application Ser. No. 62/987,084, filed on Mar. 9, 2020, the contents of each incorporated by reference herein.

TECHNICAL FIELD

This invention relates generally to supply chain, manufacturing, and logistics automation equipment, systems, and methods. More specifically, the present invention is directed to systems, devices, and methods useful for the purpose of autonomously picking items or bins from, and replacing items or bins to, storage locations within a logistics facility.

BACKGROUND

In logistics facilities, such as distribution centers or retail stores, goods are stored for retrieval by a pick worker or customer. Each type of item is known as a Stock Keeping Unit (SKU), and each SKU has a specific location in which it is kept. These items can be stored openly on shelving racks, or in compartmentalized containers, such as boxes or bins.

In a wholesale center, items are often stored in sealed cases, where individual units are packed together in a shipping case, as when they are received from a manufacturer. Cases may further be grouped together and stored on pallets, which is common for freight shipments of goods.

When goods need to be retrieved individually for order fulfillment or selection by a customer, they are typically stored individually and are not grouped into cases or pallets. The process of breaking the cases or pallets for individual product picking, that is, taking the individual pieces from the case or pallet and placing them in a specific storage location in a facility, is called put-away. The process of picking or selecting individual items from a specific storage location in a facility is known as piece picking or each-picking. Put-away and piece picking happens in both distribution warehouses and retail centers, whereas case-picking or pallet-picking typically only happens at a wholesale distribution center.

A fundamental problem with piece picking, and to a lesser extent put-away, is that it is inherently time consuming; it requires a significant portion of time to be spent traveling from one item storage location to another. For put-away a person manually brings product cases to the pick locations and breaks them open to facilitate piece picking. For piece picking of a product there is the added time it takes to find and identify the specific item of interest in its unique storage location. This is often accomplished by specific SKU numbers that positively identify the item to be picked. While different SKUs may appear to be the same, there may have some internal variations, such as weight, which cannot be identified outwardly. Finally, a person must manually pick or grasp the item and transfer it into a transport container, such as a cardboard box or plastic tote for shipping.

Due to the time-consuming nature of piece picking it is a very costly manual process, and therefore has received much attention by organizations looking to save time and money. There are many solutions for both optimizing and automating various aspects of piece picking. Some techniques look to minimize the amount of travel time required to move from one point to another by reorganizing the SKU locations such that the most frequently accessed items are grouped together or require a minimum amount of reach by a worker grasping the item.

Automation solutions range from augmenting manual labor with various technologies to completely replacing labor with customized picking equipment and infrastructure. For example, some automation systems support manual workers with barcode or radio frequency identification (RFID) scanners that enable them to more rapidly locate and identify a product. Others, such as voice picking technology, provide the piece picker with an audio and speech interface headset that communicates to the worker which items to pick and their location thereby enabling a hands-free process that improves speed and productivity.

There are also many types of automated machines that enable more efficient picking operations. For example, large scale goods-to-person Automated Storage and Retrieval Systems (AS/RS) allow a pick worker to remain in a fixed location. These systems have movable SKU storage bins that can be carried by a machine to and from a fixed storage location and delivered to a worker for picking individual pieces out of the bins. There are also Automated Guided Vehicle (AGV) systems that can transfer storage racks to and from a pick area where a worker can locate and grab the requested item.

The automation equipment technologies presently available for picking operations require a substantial modification of infrastructure for the logistics center in which they are used. This requires a significant up-front investment from the facility, which is difficult to afford and is the main reason such solutions have not been widely adopted. As such, many distribution facilities still rely on manual labor to accomplish piece picking. Further, current automation systems are not viable for retail centers because the infrastructure must also be accessible to the customer. That is, current automation equipment cannot be used within a retail facility which relies on simple static shelving for product storage and display.

Currently, logistics facilities follow a standard process for put-away and picking of goods. Items arrive into the facility at a receiving area, typically in cases or pallets, and are commonly registered into an Inventory Management System (IMS) or Warehouse Management System (WMS). A WMS is a software database which stores information about SKUs which may include the product size, weight, inventory count, storage location, etc. After the items are received, they are put-away into their storage locations, typically open shelving or racks. This is usually a manual process which involves a stock worker physically moving the items to a location and transferring the items onto the shelf or rack.

Picking is done by a manual pick worker, also called selector or picker, in a warehouse, or by a customer in a retail facility. In a warehouse, picking happens after an order is received from an external customer. The orders are typically registered with the WMS, which then creates a work order, commonly known as a pick list, which instructs the picker which items must be retrieved, their quantities, and location within the facility. The picker then must find the items and physically transfer them to a shipping container that is associated with the order.

The two primary objections to automation for picking using currently known systems are: first, that the perceived upfront cost is too high, and second, that automation equipment is not flexible enough to accommodate changes to inventory or the operation process. As such, the majority of businesses have continued to rely on manual picking labor. The high cost and inflexibility of current automation is largely due to the infrastructure changes required for such solutions. Therefore, a solution that does not require changing significant infrastructure in a facility, such as using existing shelving and racks, and works side-by-side with manual labor is desired. Such a solution would reduce upfront cost and keep the flexibility of human workers available.

SUMMARY

The presently disclosed invention overcomes many of the shortcomings of the prior art by providing systems, devices and methods for robotic piece picking or put-away directly from existing stock item locations in a logistics facility. The presently disclosed invention provides a mobile robotic system that includes sensors and manipulator arm(s) to perceive, localize, reach, grasp and transfer SKUs from a storage rack to a transport container for piece picking, or conversely, from a transport container to a storage rack for put-away. This system and method allow existing facility infrastructure to remain intact and further allows the facility to use both manual picking and robotic picking interchangeably.

The presently disclosed robotic system and method solves several aspects of robotic piece picking or put-away which are challenging and remain unsolved in the prior art. Specifically, the system enables robotic picking to be done rapidly using a manipulator arm on a mobile base that can autonomously navigate and position itself within an existing facility. The method and unique system design enable perception, localization and grasping of SKUs in a sufficiently fast manner that is essential for operational viability and economy. It also reduces the complexity and cost required for autonomous navigation of the mobile base.

According to its major aspects, and briefly stated, the presently disclosed invention includes a system for piece picking or put-away within a logistics facility comprising a central server and at least one mobile manipulation robot. The logistics facility may be a warehouse, distribution center, manufacturing facility, or retail facility. The central server comprises a server communication interface, one or more server processors, and a server memory. Each of the mobile manipulation robots comprise a mobile base, at least one articulated manipulator arm having an end effector, at least one piece containment area, a plurality of sensors, a remote communication interface, a robot memory configured to store robot specific information, and one or more robot processors coupled to the sensors, the robot memory, the mobile base, and the at least one articulated manipulator arm.

The robot specific information may include at least calibration data for the plurality of sensors. The robot memory may comprise computer program instructions executable by the one or more robot processors to receive data from and send data to the central server, process data received from each of the sensors, and output control signals to the mobile base and the at least one articulated manipulator arm.

Further, the plurality of sensors provide signals related to detection, identification, and location of the piece to be picked, and the one or more robot processors analyze the sensor information to generate articulated arm control signals to guide the end effector of the at least one articulated manipulator arm to pick the piece. The sensors may also provide signals related to a unique identification for the piece to be picked, an obstacle detected in the path of the at least one mobile manipulation robot, and a current location within the logistics facility of the at least one mobile manipulation robot.

In certain embodiments of the system, the server memory may comprise computer program instructions executable by the one or more server processors to receive data from a warehouse management system and dispatch the at least one mobile manipulation robot. The server communication interface may connect with the remote communication interface to send and receive piece picking data which may include a unique identification for each piece to be picked, a location within the logistics facility of the pieces to be picked, and a route for the at least one mobile manipulation robot to take within the logistics facility. The unique identification for the piece to be picked may comprise a shape of the piece, a size of the piece, a weight of the piece, a color of the piece, a property of the construction material of the piece, such as roughness, porosity, and deformability, a visual marking on the piece, a barcode on the piece, or any combination thereof. Further, the connection between the server communication interface and the robot communication interface may be via one or more wired or wireless networks, or a combination thereof.

In embodiments of the system, the at least one mobile manipulation robot may be able to autonomously navigate and position itself within the logistics facility by recognition of at least one landmark by at least one of the plurality of sensors. The landmark may be a vertically mounted marker placed at a specific location within the logistics facility or may be other identifiable visual or audible landmarks within the logistics facility. The sensors may be any 3D device capable of sensing the local environment such as, for example, 3D depth cameras, color cameras, grey scale cameras, laser ranging devices, sonar devices, radar devices, or combinations thereof.

In embodiments of the system, the at least one item containment area may be configured to sense a weight for an item placed therein. The at least one item containment area may be at least one of a platform, a pick-to-kit holder, a container holder, or any combination thereof. Further, more than one item may be placed on the at least one item containment area by the articulated manipulator arm.

Certain embodiments of the system may further comprise a conveyance device configured to accept items from the at least one mobile manipulation robot. The conveyance device may be a conveyor belt which transfers the accepted items from a transfer area to a receiving area, wherein the receiving area is a packing area, a shipping area, a holding area, or any combination thereof.

In certain embodiments of the system, the at least one mobile manipulation robot may further comprise a user interface having a graphical display monitor and an input device. The input device may be a touch screen, voice command interface, facial tracking interface, small liquid crystal display (LCD) interface, track ball, or keyboard. Further, the user interface may display user information such as direction indicators showing the intended direction of movement of the robot, and error information. In embodiments, the mobile manipulation robot may also include at least one safety light, an alarm buzzer, and at least one emergency stop button reachable by nearby workers.

In certain embodiments of the system, the at least one articulated manipulator arm may have a first end portion pivotally carried by the wheeled mobile base of the robot and a second end portion comprising the end effector. Further, the first end portion of the at least one articulated manipulator arm may be mounted on a vertical actuator stage configured to raise or lower the at least one articulated manipulator arm. The end effector may be a gripper, a suction cup, an electroadhesion end effector, a magnetic end effector, or combinations thereof, and the robots may comprise an end effector swap mechanism configured to permit a change of the end effector. When the end effector is a suction cup, such may be connected to a vacuum pump through a valve, wherein actuation of the valve may be controlled by the one or more robot processors.

In certain embodiments of the system, the at least one articulated manipulator arm may further comprise an extension tool positioned at or near the second end portion. The extension tool may be sized so that it can fit into a shelf without the risk of obstructing the view of the sensors and/or interfering with non-picked items on the shelf. In certain embodiments, the extension tool may be long enough to reach into the back of a shelf to allow the end effector to pick an item placed therein and may have a diameter that is smaller than the diameter of the end effector.

In certain other embodiments of the system, at least one sensor may be positioned at a central point on the at least one articulated manipulator arm such that rotation of the at least one articulated manipulator arm directs the at least one sensor to view the at least one item containment area. The at least one item containment area may comprise a calibration target which allows calibration of the at least one sensor located at the central point on the at least one articulated manipulator arm.

In certain embodiments of the system, the at least one mobile manipulation robot may further comprise batteries and/or a charging port for connection to a charging station. Such charging may be accomplished manually by a wired connection to warehouse power, or automatically via a charging port or station.

The presently disclosed invention also includes a method of picking or put-away within a logistics facility. The method may use a system for picking or put-away which includes a central server and at least one mobile manipulation robot as defined in any of the embodiments described above, and may include the steps of:
  receiving at a central memory via a server communication interface at least one item picking order including at least one item to be picked;
  generating at the one or more server processors a picking itinerary based on the at least one picking order, wherein the itinerary includes a unique identification for each item to be picked, a location within a logistics facility of the items to be picked, and a route for the at least one mobile manipulation robot to take within the logistics facility;
  receiving at a robot memory the picking itinerary;
  moving the at least one mobile manipulation robot along the route to the location within the logistics facility of the items to be picked;
  picking the at least one item to be picked from the location using an end effector of at least one manipulator arm; and
  placing the at least one item to be picked in the at least one item containment area.

In certain embodiments of the method, the plurality of sensors may provide signals related to detection, identification, and location of the at least one item to be picked, and one or more robot processors may analyze the sensor information to generate articulated arm control signals which guide the end effector to pick the item. Furthermore, these sensors may allow the at least one mobile manipulation robot to move through a logistics facility autonomously by recognition of at least one landmark.

In embodiments of the method, the at least one item picking order received at the central memory may be generated by a warehouse management system. In other embodiments, a picking order may be generated by a human user at a user interface which is attached to the robot and which communicates with the one or more robot processors and a robot memory. In such an embodiment, the picking itinerary may be generated by the one or more robot processors or may be generated by the one or more server processors after the picking order has been sent to the central memory via communication between a robot communication interface and the server communication interface.

In certain other embodiments of the method, at least one sensor may be positioned at a central point on the at least one articulated manipulator arm such that rotation of the at least one articulated manipulator arm directs the at least one sensor to view the at least one item containment area. The at least one item containment area may comprise a calibration target which allows calibration of this at least one centrally located sensor.

Furthermore, the method may improve pick accuracy over the prior art by sensing a weight for the at least one item placed in the at least one item containment area.

The present invention further relates to a method for executing an order fulfillment operation within a logistics facility, the method comprising: receiving at a remote server via a server communication interface at least one order including at least one item to be picked; generating at the remote server a task list based on the at least one order, wherein the task list includes a unique identification for the at least one item, and a first location within the logistics facility for the at least one item; sending, from the remote server via the server communication interface, the task list to a server of a manipulation robot; and moving the manipulation robot autonomously along a route within the logistics facility to a first location for the at least one item, and picking the at least one item from the first location using an arm of the manipulation robot, wherein at least one sensor on the manipulation robot provides signals related to detection, identification, and location of the at least one item to be picked, and one or more processors of the server of the manipulation robot analyze the signals to generate arm control signals to guide an end effector of the arm to pick the at least one item with a collision free path throughout a controlled motion of the arm.

According to certain embodiments of the method for executing an order fulfillment operation, the task list generated on the remote server may include dynamically defined work zone perimeters, wherein the work zones include robot only work zones, human only work zones, and shared work zones. Moreover, the work zone perimeters may be updated at any time during an order fulfillment operation. The task list may further include instructions displayed on a user interface screen of the manipulation robot, wherein the displayed instructions include directions intended for a human worker in the logistics facility, wherein the first location of the at least one item may further include a position of the human worker.

According to certain embodiments of the method for executing an order fulfillment operation, the task list further includes a second location within the logistics facility for the at least one item, and in the event that picking the at least one item from the first location is not successful, the method further includes: moving the manipulation robot autonomously along the route within the logistics facility to the second location and picking the at least one item from the second location using an arm of the manipulation robot. Moreover, the task list may further includes a third location within the logistics facility for the at least one item, and in the event that picking the at least one item from the first and second locations is not successful, the method further includes: moving the manipulation robot autonomously along the route within the logistics facility to the third location and picking the at least one item from the third location using an arm of the manipulation robot.

According to certain embodiments of the method for executing an order fulfillment operation, wherein the task list further includes a location and orientation of grasping points on the at least one item for the end effector of the arm to use for grasping the at least one item. Additionally, the task list may include a unique identification for the at least one item, and the first location within the logistics facility for the at least one item includes an identity of a shelf defined by a shelf marker and an identity of a region of interest on the shelf defined by two fiducial markers positioned at horizontal edges of the region of interest. According to some embodiments, the shelf marker may comprise a vertically positioned barcode, and/or the fiducial markers may comprise a 2D code.

The present invention further relates to a method for autonomous robot navigation and region of interest localization, the method comprising: receiving data captured by a sensor coupled to a robotic device during navigation of the robotic device; analyzing the received data to detect at least one identifier corresponding to a region of interest; for each detected identifier: using the data to determine a current pose of the robotic device within a logistics facility; and generating a navigation instruction for navigation of the robotic device to a location of an item, the navigation instruction based on the current pose of the robotic device and a location of a region of interest at which the item is located.

According to certain embodiments of the method for autonomous robot navigation and region of interest localization, the at least one identifier comprises two fiducial markers may be positioned at horizontal edges of the region of interest. Moreover, each of the two fiducial markers comprise 2D codes. The at least one identifier may comprise: a first fiducial marker that defines an x and y coordinate of a storage rack within the logistics facility, and at least one second fiducial marker that defines an x, y, and z coordinate on the storage rack of the region of interest. Moreover, the first fiducial marker may comprise a vertically oriented 1D barcode, and the at least one second fiducial marker may comprise two markers, each of the two markers positioned at a horizontal edge of the region of interest, wherein the second fiducials markers are 2D-code markers.

BRIEF DESCRIPTION OF DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale. The illustrative embodiments in the following drawings are not meant to be limiting; other embodiments may be utilized, and other changes may be made without departing from the spirit or scope of the subject matter presented herein.

DETAILED DESCRIPTION

Figures 1A, 1B:
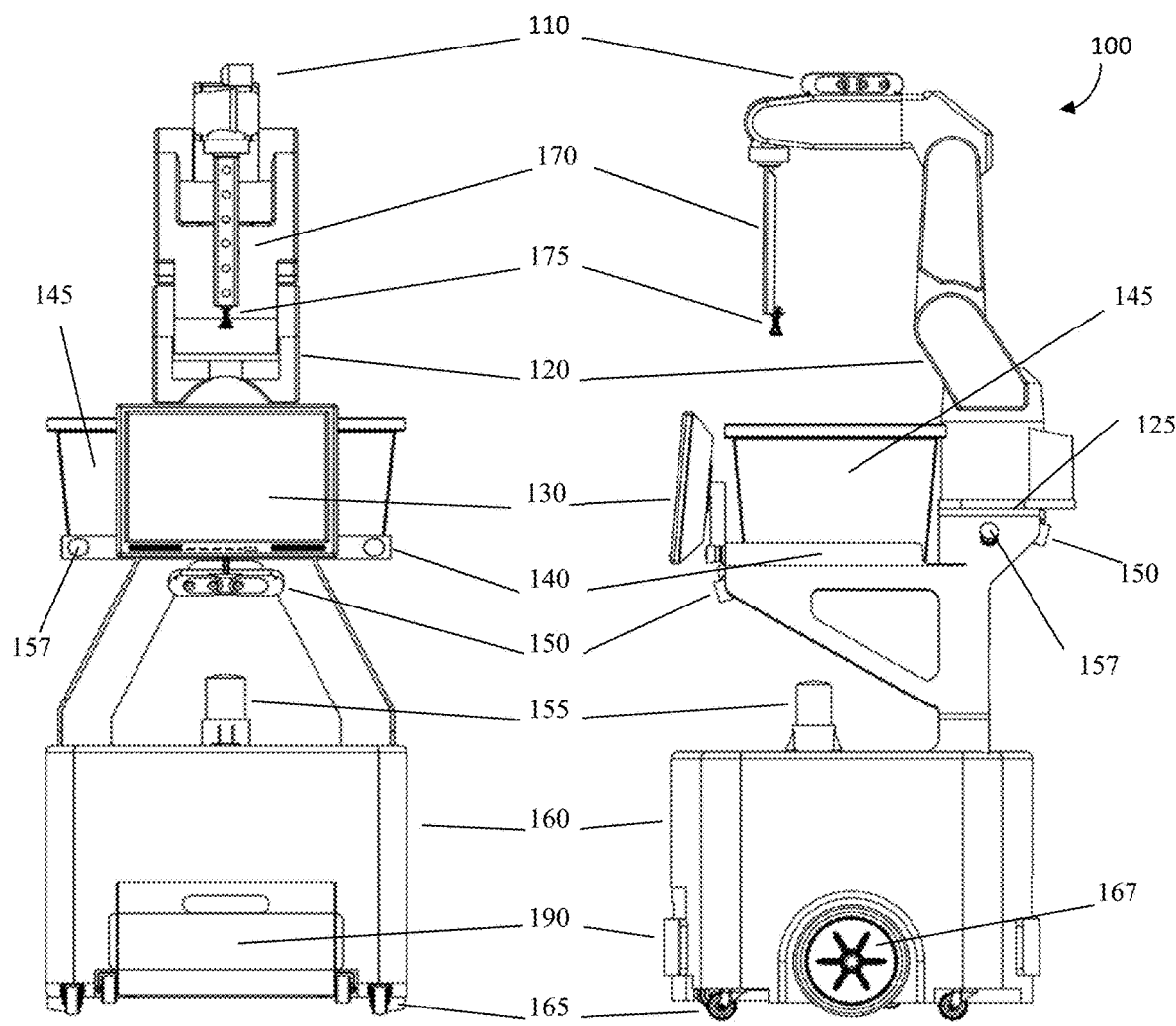
FIG. 1A and FIG. 1B are the front and side views, respectively, of an exemplary embodiment representing a mobile manipulation robot in accordance with certain aspects of the presently disclosed invention.

In the following description, the present invention is set forth in the context of various alternative embodiments and implementations involving a system and method for automated robotic picking or put-away within a logistics facility, where the logistics facility may be, but is not limited to: a warehouse, a distribution center, a manufacturing facility or a retail facility. The presently disclosed invention utilizes both robotics hardware and software technologies that are detailed in the following description.

The above summary and drawings are not intended to describe or show each illustrated embodiment or every possible implementation of the presently disclosed invention. Furthermore, various aspects of the system and method for picking or put-away with a mobile manipulation robot may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" may be used herein to describe one element's relationship to another element illustrated in the drawings. It will be understood that relative terms are intended to encompass different orientations of aspects of the system in addition to the orientation depicted in the drawings. By way of example, if aspects of the mobile manipulation robot shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

As defined herein, a Stock Keeping Unit (SKU) refers to a distinct item, and embodies attributes associated with the item that may distinguish it from another item. For a product, these attributes may include, but are not limited to, the product manufacturer, product description, material, size, shape, color, weight, and packaging. Further, an individual SKU may also have a code imprinted thereon which may indicate some of the same above attributes. Examples of such codes include at least 1D-barcodes such as a Universal Product Code (UPC), International Article Number (EAN), and Global Trade Item Number (GTIN), Code 39 barcode, Code 128 barcode, Interleaved 2 of 5 (ITF), Code 93, Codabar, GS1 databar, and MSI Plessy. Examples further include 2D-codes such as a QR code, Datamatrix code, PDF417 code, Aztec code, and ArUco markers.).

The terms "goods," "products," "items," and SKUs may be used interchangeably, and may be taken to indicate items that need to be retrieved and/or stored. Such items can include any consumer product, including but not limited to, packaged and unpackaged products (e.g., packaged food and individual units Referring now to the drawings, embodiments of food such as produce). Such items can also include items that are not considered consumer products (e.g., library items). Furthermore, while each of these terms is generally understood to indicate a single unit, these terms may refer to groups of these units packaged together, such as in a multipack or in a case.

The terms "bin" and "tote" are also used interchangeably, and may be taken to mean a container used to store products or goods while they are located on a shelf within a logistics facility, or as they are moved throughout the logistics facility on a robotic system or conveyor belt.

The process of selecting and retrieving items, totes, or cases from a specific storage location in a facility is referred to as "and method for piece picking", wherein selection of individual products or items may also be referred to as piece-picking or each-picking. The process of breaking cases for individual product picking, i.e., taking the individual items from the case or pallet and placing them in a specific storage location in a facility, is called "or put-away". Put-away may also comprise placing totes or cases in a specific location within a facility or placing multipacks in a specific location within a facility. Picking and put-away occurs in both distribution warehouses and retail centers.

The terms "storage" and "data storage" and "memory," when used in the context of a computer system or method, may be used interchangeably and may be taken to indicate both transient and permanent storage (i.e., on a non-volatile memory hardware device) of data on a computer.

The term "logistics" facility may be taken to mean any facility that provides for the efficient production, storage, and/or flow of goods. Exemplary logistics facilities include at least warehouses, distribution centers, retail centers, and manufacturing facilities.

The terms "shelf" and "rack" are used to indicate a storage unit within a logistics facility. As used here, however, these terms may also refer to locations or regions of interest within a logistics facility. Moreover, while the term "slot" is used with respect to a shelf or rack to indicate a defined section having specifically delimited edges, the term slot may also be understood to refer to a region of interest. Thus, for example, a slot may also be understood to indicate a general position on a floor within a logistics facility or on a shelf in which an item or bin or tote may be stored.

The term "warehouse management system" or WMS may be understood to mean any database which stores information about items or products stored within a logistics facility, and may include the product size, weight, inventory count, storage location, etc. The terms "warehouse execution system," or WES and "warehouse control system," or WCS may be understood to mean a software application that directs the real-time activities within logistics facility. The terms warehouse management system, WMS, warehouse execution system, WES, warehouse control system, and WCS are used interchangeably herein, and reference to one may comprise reference to any or all of these terms. Moreover, the term "remote server" may be used to refer to at least a processor/memory of a computing system remote from the robotic system being discussed, such as the central server or a processor/memory of the WMS, WES, and/or WCS.

As used herein, the terms "shelf tag" and "marker" may refer to an object used to identify a location. Most commonly a shelf tag or marker may be a fiducial marker placeable in the field of view of an imaging system. Exemplary fiducial markers include at least 1D and 2D bar codes and ArUco markers. Shelf tags or marker may also be understood to refer to an object that is not visually perceived, such as RFID, sound, or tactile markers that may identify or differentiate an identity.

The presently disclosed invention relates to methods for picking and put-away using autonomous mobile manipulation robots and/or systems comprising at least one mobile manipulation robot and a server. Such methods may include dynamic selection of work areas for each of the robots and/or humans working in a logistics facility and may further include dynamic storage and retrieval of high frequency items, bins, or cases at specific high-frequency locations within a logistics facility.

The presently disclosed invention further relates to redundant storage and pick methods that greatly increase overall pick accuracy.

The presently disclosed invention also relates to mapping and localization of specific regions of interest in an indefinite space. One specific application of the presently disclosed invention includes use of mapped locations for position and orientation (pose) recognition by a robot within a logistics facility. Other applications include use of specifically defined regions or interest for order fulfillment applications by AMRs and AMMRs that operate in a wide range of logistics facilities, including warehouses, distributions centers, and retail locations.

Figure 2:
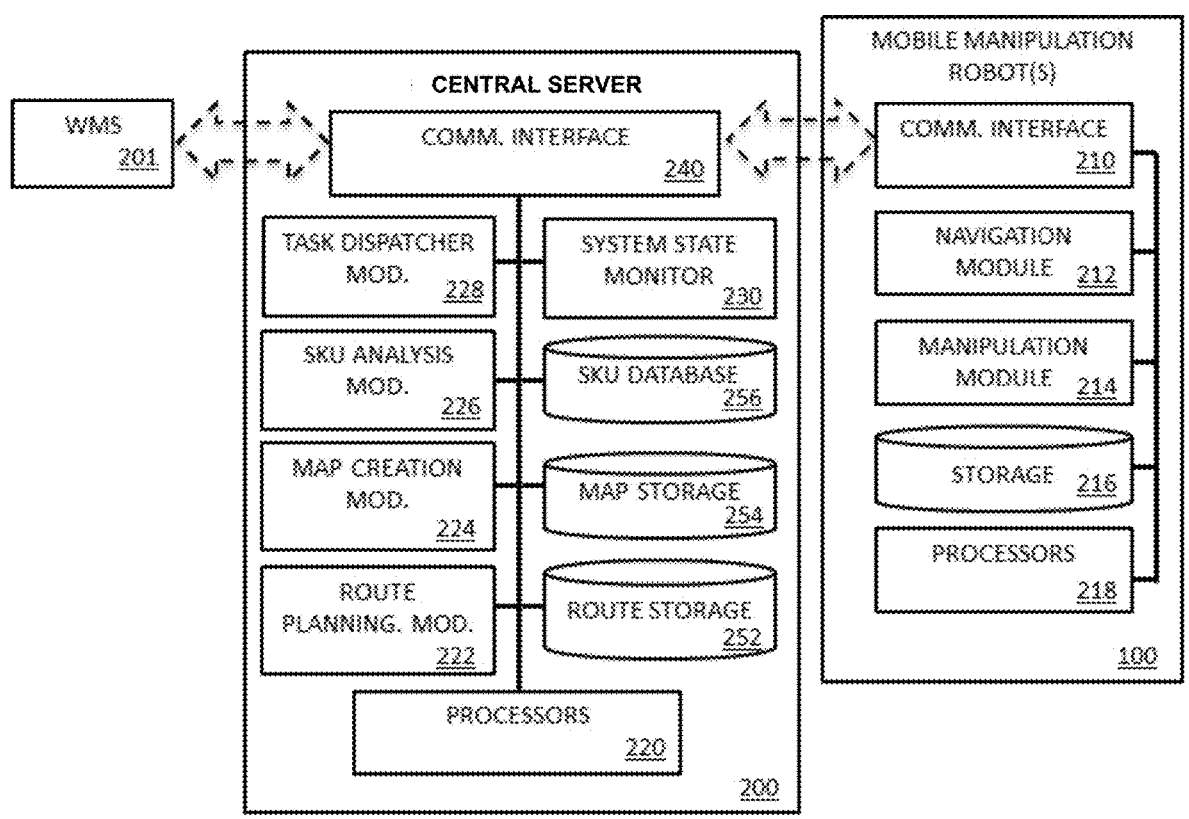
FIG. 2 is a block diagram of an exemplary embodiment representing the robotic system with the hardware and software modules of a central server and a plurality of mobile manipulation robots in accordance with certain aspects of the presently disclosed invention.

Referring now to the drawings, embodiments of the system and method for picking or put-away with a mobile manipulation robot are shown in FIGS. 1-9. FIGS. 1A and 1B are front and side views of an exemplary embodiment of one of a plurality of mobile manipulation robots 100 that can be used within the system. Internal details of components and software relevant to the system are shown in FIG. 2, which provides a block diagram of an exemplary embodiment of the system comprising a central server 200 and a plurality of mobile manipulation robots 100. The server may have an electronic communications interface (server communication interface 240) that connects with an electronics communication interface on the manipulation robot(s) (remote communication interface 210). This connection may be established through a wireless network via a wireless access point in a preferred embodiment. Other embodiments may include or instead use a different type of communication, such as a tethered wire connection or other point-to-point wireless data exchange.

As shown in FIGS. 1A, 1B and 2, in certain embodiments the individual manipulation robots 100 may have a wheeled mobile base 160, internal batteries 190, and an onboard computer processor 218 with memory storage 216. The robots may also have at least one temporary storage bed 140 for picked items and at least one robotic manipulator arm 120. The onboard computer processor 218 may be configured to run a set of programs with algorithms capable of performing navigation and picking. Further, the onboard computer processor 218 utilizes data from sensors (150, 110), to output control signals to the mobile base 160 and manipulator arm 120 for navigation and picking, respectively.

As mentioned above, the onboard computer processor 218 may also have local persistent memory storage 216 which stores specific information relevant to the configuration of each manipulation robot 100. Such information may include sensor calibration data, actuator tuning parameters, and other platform specific data. The onboard computer processor 218 may also communicate with the central server 200 to receive pick order information and respond back with confirmation data to inform the central server 200 of successful picks or any errors that might occur.

Each manipulation robot 100 may also have a user interface 130, which includes a graphical display monitor and an input device, where the input device may be a touch screen 130, a track ball, voice command, a keyboard, input buttons or any combination of these devices and possibly others. The user interface 130 allows a user to command and control each manipulation robot 100 to perform localized tasks and to enter product picking dispatch information manually, thus sending the robot on its mission. In addition, in one embodiment, each manipulation robot 100 may contain an external swappable memory port on a side, where necessary information may be uploaded to the robot directly when the operator inserts a data storage device, thus by-passing the wireless communication to the server. The data storage device may be a disk, USB flash device, or other forms of external memory storage devices. In other embodiments, the data is transferred through proximity communication technologies, such as near field communication (NFC), Bluetooth, or short-range radio-frequency identification (RFID) standards.

Each manipulation robot 100 may also be equipped with safety features which may include: one or more safety lights or strobes 155, an audible warning annunciator or horn, one or more emergency stop buttons 157, the ability to display fault, error and/or intended action (such as navigation turn signal) information on the user interface 130 or at some other point on the manipulation robot 100, or any combination thereof.

Furthermore, each manipulation robot 100 may be configured to receive signals from the central server 200, or directly from the WMS 201, which may indicate an emergency and may direct the robot 100 to stop and/or may further activate the one or more safety lights or strobes 155 and/or audible warning annunciator or horn. In the event that an unstable and/or unsafe diagnostic state for the manipulation robot 100 is detected by the one or more robot processors 218, the robot 100 may be stopped. The manipulation robot 100 may also be stopped if the sensors (150, 110) detect a human or obstacle in close proximity or detect unsafe operation of the robot 100. Such signals may be processes at the central server 200 which may then control the robot speed and or direction of operation.

The safety features of the robots disclosed herein may include a health monitor module on the robot processor/memory that may receive signals from the various sensors and may communicate a fault or error state to a remote server. As example, the health monitor may register a power loss, or obstacle, or sensor failure and may communicate this information to the remote server. The robotic health monitor may cause the robot to stop, slow movement, signal an audible or visual error state, or change routes, or after receiving signals from the robot regarding an error or fault state, the remote server may cause any of these actions. Certain limits may be dynamically set for the robots depending on the logistics facility and/or specific job requirements of the robot. For example, in facilities where human workers may work side-by-side with the robots of the present invention, the distance limits at which an object is registered as an obstacle may be set to avoid accidental contact with a human, or the robot may be configured to slow when approaching a human worker. Additionally, should an error be registered at the remote server for a robot, a human worker may be dispatched to clear the error (e.g., move an obstacle).

Figure 5A:
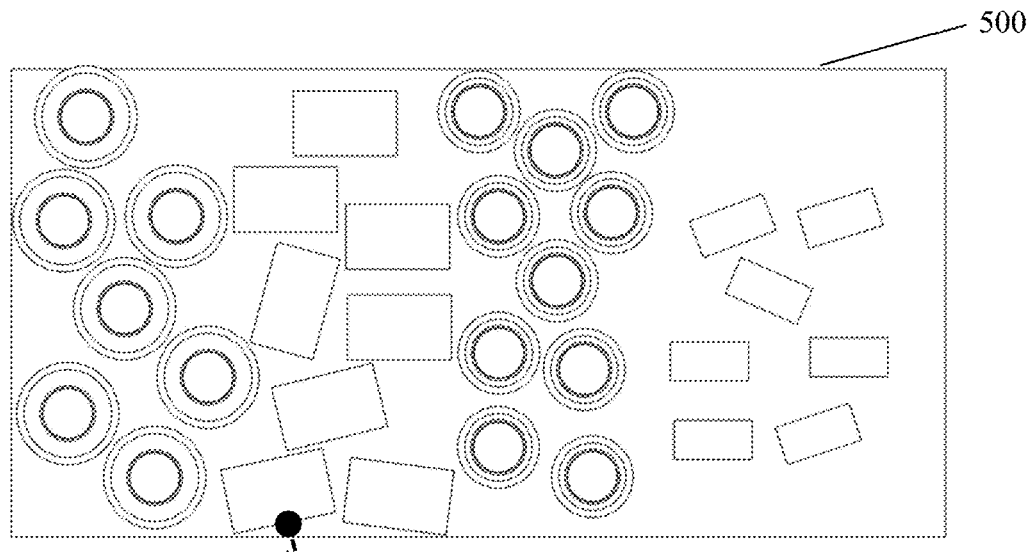
FIG. 5A and FIG. 5B are the top and front views of an exemplary pick location with example items, grasp positions and vectors in accordance with certain aspects of the presently disclosed invention.
Figure 5A:
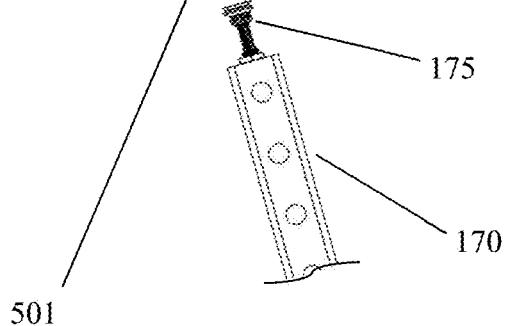
Figure 5B:
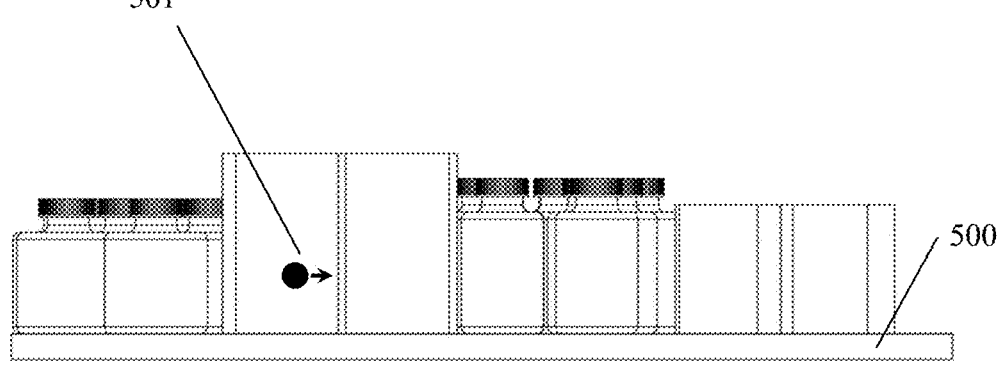

An articulated robot manipulator arm 120 is used in the presently disclosed system to pick items with the common variability found in item size, shape, weight and placement within a logistics facility. An exemplary representative drawing of such variability is shown in FIGS. 5A and 5B, which are the top and front views, respectively, of a stocked shelf 500. Common logistics storage infrastructure, such as an ordinary shelf or rack 500, does not constrain any item location and orientation for the purposes of any deliberate accuracy, therefore, in order for a robot to do a pick at random it must have sufficient freedom to grasp an item in various configurations. As such, a robot manipulator arm 120 provides the manipulability necessary to pick an item in any configuration in which it is found. The presently disclosed systems and methods are further capable of picking individual items from within a bin, where the items may be positioned in any orientation, and may even be partially covered by other items within the bin.

The manipulation robot 100 may physically adjust for variations in item location and orientation which may be determined from sensor 110 information prior to the pick. In a one embodiment, the manipulator arm 120 may be mounted to the robot frame 125 at a position on top of the mobile base 160 of the manipulation robot 100. The manipulator arm 120 enables the robot to reach multiple shelf level heights. Some embodiments may extend the vertical reach of a robot by mounting the manipulator arm 120 on a vertical actuator stage. The vertical actuator stage would be able to raise and lower the manipulator arm 120 so an end effector 175 can reach both higher and lower pick locations. In different embodiments of the system, additional robot manipulator arms 120 may be included which may provide additional lift capability to pick objects of various shapes and sizes when the arms work cooperatively, or to pick more than one object at a given pick location using arms working in parallel but independently. For multi-arm embodiments, the arms may be the same or have different kinematic configurations and may have the same or different end effectors.

The present robot system uses a grasping end effector 175 on the manipulator arm 120 to pick items from their stored location and transfer them to a temporary location, or vice-versa. In a preferred embodiment, the grasping end effector may be a suction cup 175, which may be connected to a vacuum pump through an onboard computer processor 218 controlled valve. The vacuum suction at the suction cup 175 may be engaged and disengaged by actuating the valve, thereby allowing the manipulation robot 100 to grasp the desired pick item on contact and then release it when necessary. The use of a suction cup 175 also allows the robot to grasp a target item at a single point and orientation, which reduces the computation time required for the system to determine how to grasp the pick item.

In other embodiments, the end effector may be a mechanically actuated gripper such as, for example, a robotic hand having articulated digits. In yet other embodiments, the end effector may be a simple gripper, an electroadhesion end effector, a magnetic end effector, or combinations thereof, and the robots may comprise an end effector swap mechanism configured to permit a change of the end effector. Exemplary magnetic end effectors may utilize electromagnets, permanent magnets, or magnet arrays which provide opposing magnetic fields. An electroadhesive end effector may use reversible electrostatic adhesion to grip an item while it is picked and put. In embodiments which use an electroadhesive or magnetic end effector, such end effectors may be powered by an electrical power supply configured to generate an electrostatic or magnetic adhesive force that is used to releasably adhere the item to the end effector. The onboard computer processor 218 may control the power supply to activate and deactivate the electrostatic or magnetic adhesive force of the end effector.

The use of one, various interchanged, or a combination of end effector technologies is driven by the physical properties of the grasped objects as to generate a sufficient amount of lift force to carry the objects by the manipulator arm without causing damage or visible alterations.

The presently disclosed system design also includes an extension tool 170 mounted at the end of the robot manipulator arm 120, as shown in FIG. 1. This tool 170 enables the manipulation robot 100 to position the grasping end effector 175 at a sufficient depth into a storage rack so that the end effector may reach a desired item while maintaining clearance for the manipulator arm 120 itself from contacting the infrastructure. It also enables the end effector 175 to reach into shelf corners where it would otherwise not have clearance for the robot manipulator arm 120. In certain embodiments, the extension tool 170 may be sized based on specifics of the logistics facility such as, for example, shelf depth. That is, the extension tool 170 may be long enough to reach into the back of a shelf, as mentioned above, so that the end effector 175 may pick an item placed therein. Furthermore, the extension tool 170 may have a diameter that is smaller than the diameter of the end effector 175. This may allow the extension tool 170 to reach into a shelf without obstructing the view of the end effector 175 and/or the item to be picked, and may simplify the computation required to locate the item as no additional sensor information may be required to locate the extension tool; information regarding the end effector 175 would be sufficient.

In certain embodiments of the system, the extension tool 170 may be a replaceable or switchable part of the robot manipulator arm 120. In this way, logistics facilities having different configurations such as, for example, deeper shelving, may be accommodated by simply switching out the extension tool 170 to one more suited for the work (e.g. a longer extension tool). Furthermore, in embodiments where the end effector 175 is mounted directly to the extension tool 170, different end effectors may require different connection mechanisms at the end of the extension tool. As such, the ability to switch out the extension tool 170 to one having a suitable connection means may improve the ease of use of the manipulation robot 100.

While each of the aforementioned actions of the manipulator arm and end effector, and optional extension tool, are discussed with respect to picking an item from a shelf, the robotic devices, systems, and methods disclosed herein may also be useful for picking bins, totes, or cases from a shelf, or from another robot (i.e., an autonomous mobile robot, other manipulation robots, conveyance systems, human workers, etc.). Moreover, the picking of individual items is discussed with reference to FIGS. 5A and 5B, wherein the items are stored openly on shelving. The present systems and methods envision picking of items that may be stored as multiples of items, e.g., multipacks, and/or may be stored in any configuration within bins, i.e., individually, as multiples, mixed with other items in a bin, etc.

After items are picked, they may be placed into the storage bed 140 for transportation. The bed may also carry a container 145, such as a box or tote, in which the items can be placed. This method enables multiple items to be picked for a given order or batch of orders. This method frees the robot manipulator arm 120 to pick additional items without needing to take multiple trips to and from an order transfer area 360 (See FIG. 3). Additionally, by carrying a packing box or container or transport tote 145 onboard, the manipulation robot 100 is able to aggregate order items together into a single container that can be easily swapped with a different container for additional order fulfillment.

In certain embodiments, the storage bed 140 may comprise a calibration target which may be viewed by one or more sensors 110 placed at a central location on the manipulator arm 120 (see FIG. 1). These centrally located sensors 110 may be positioned to view the calibration target on the storage bed 140 when the manipulator arm is rotated. As such, information on the calibration target may be used to calibrate these sensors 110 to ensure that all parameters are within specifications, and if not, update the parameters to reflect the current configuration. The dual use of the storage bed 140—as a platform to hold picked items and as a calibration target—reduces the size profile of the presently disclosed manipulation robot and improves the accuracy of the system.

The central location of one or more sensors 110 on the manipulator arm 120 allows for improved item picking accuracy. First, these sensors 110 will have an unobstructed and enlarged view of the items to be picked and their storage locations, which is improved over the view that is provided by sensors placed at the end of a robotic arm or on the mobile base, as is the case in many prior art systems. Furthermore, sensors mounted at the end of a robotic arm may get in the way of, or reduce the range of positions available to, an end effector. Sensors mounted on the mobile base may have their view of the items to be picked and their storage locations impeded by movement of the robotic arm.

Second, the central location of the one or more sensors 110 on the manipulator arm 120 provides improved measurement accuracy of the item to be picked. The manipulator arm 120 may move and articulate at more than one point along the arm, and each movement introduces potential error to any measurements that may be made between the end effector 175 and the items to be picked by sensors positioned on the mobile base 160. Placement of the sensors 110 at a central location may reduce this error by bringing the sensors 110 closer to the items to be picked, and thus removing the error inherent in several points of articulation.

Figure 3:
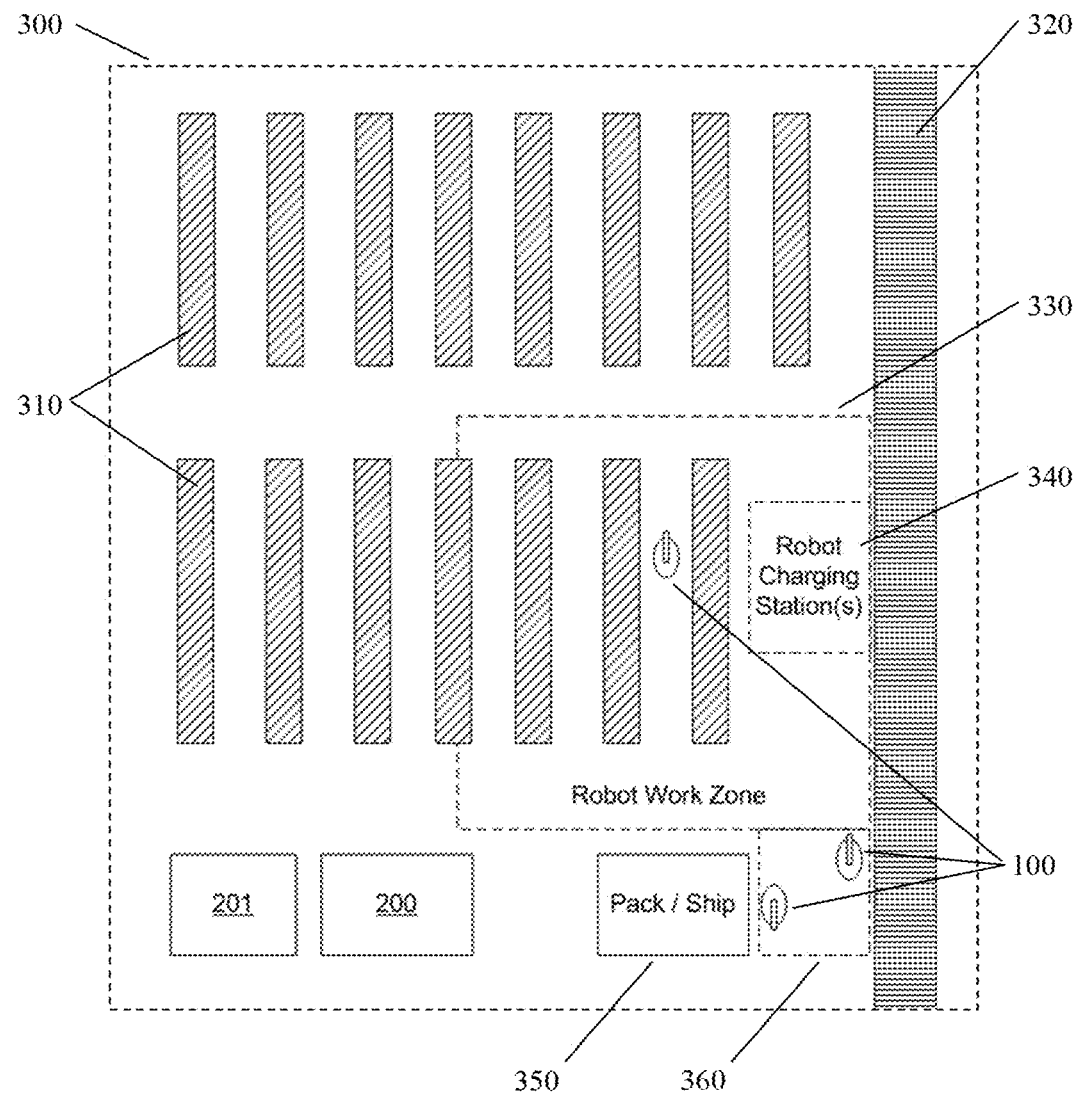
FIG. 3 is a simplified overhead floor plan diagram of a representative logistics facility.

FIG. 3 shows an exemplary top view floor plan of a section of a logistics facility 300. The presently disclosed system and method enable object items to be picked within a defined robot work zone 330, which stores stocked objects on common commodity shelving 310. The system and method may define a plurality of transfer areas 360 in which items would be transferred to and from the manipulator robots 100. The transfer area 360 may possibly interface with a packing and shipping station 350, or a conveyor 320 or a staging area, or any combination thereof.

At the transfer area 360, a worker may remove the picked items or container 145 holding the items from the robot 100. If a container 145 is removed, a new container 145 could be transferred to the robot 100 for fulfillment of the next order. The method may employ transfer of picked items or the container 145 by a human operator or, in other embodiments, the transfer of items may be automatic. That is, in some embodiments, the onboard robot storage bed 140 may have a mechanically actuated conveyance device that allows for automatic transfer. The conveyance device may be a small conveyor belt or may be a set of rollers or wheels, which is capable of shifting the held items or container 145 to and from another platform or conveyance.

In an alternative embodiment, the automatic transfer of objects from the onboard storage bed 140 may be performed by the manipulator arm 120 of the manipulation robot 100. In such an embodiment, the manipulation robot 100 may transfer individual items by using its end effector 175 grasping mechanism or the robot may transfer a container 145 carried in the storage bed by manipulating it with an extension tool 170 and end effector tool 175. In any of these embodiments the system may be designed to interface automatically with a separate conveyor system 320 which may be adjacent to the transfer area 360, whereby items or containers 145 could be automatically moved through a conveyor 360 around a facility to and from a robot picking area 330. This method has the advantage of requiring less manual work to be done to transfer objects from a manipulator robot 100 after they are picked.

Figure 7A:
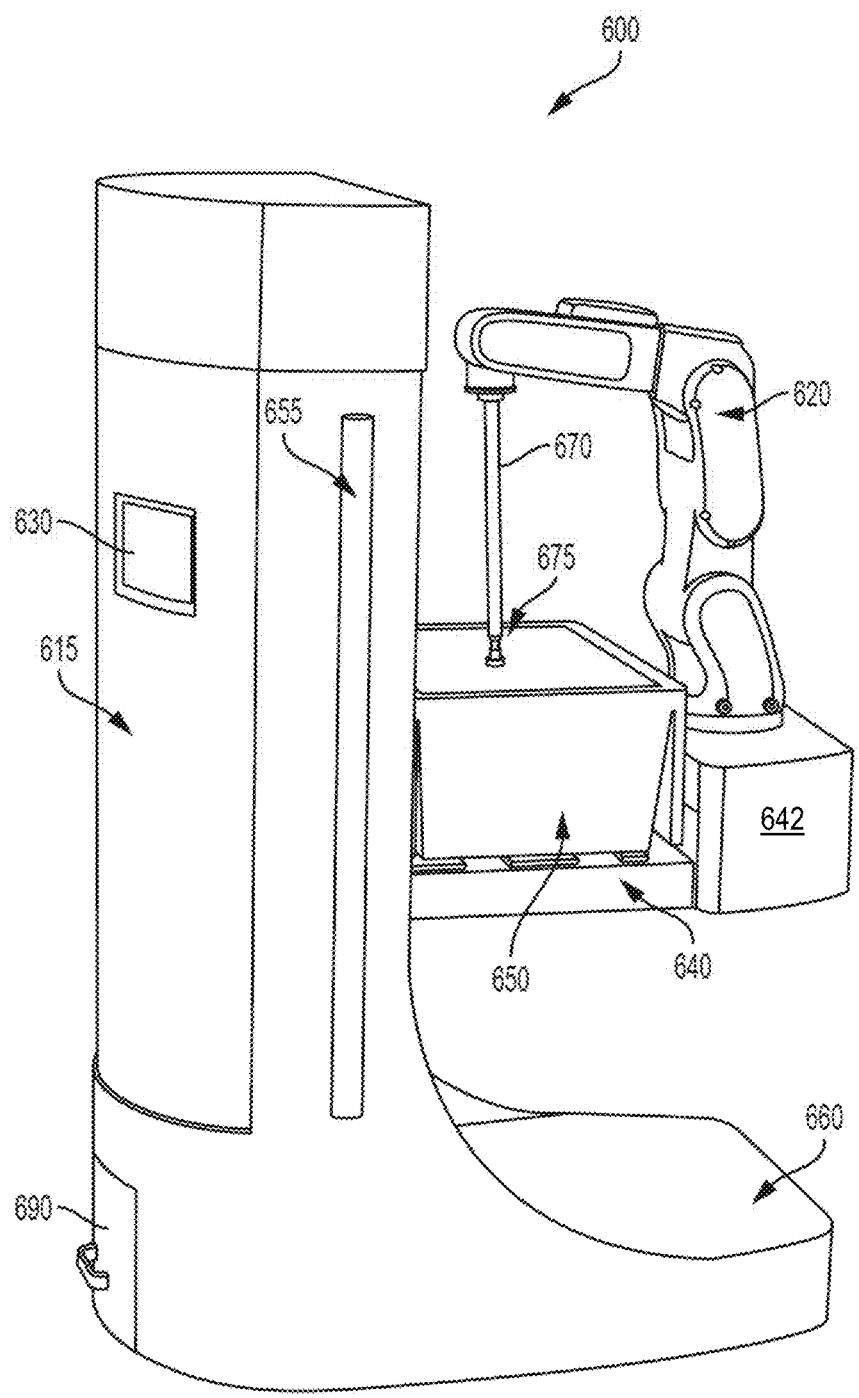
FIGS. 7A and 7B illustrate front and side views, respectively, of an autonomous mobile manipulation robot or manipulation robot in accordance with certain aspects of the presently disclosed invention.
Figure 7B:
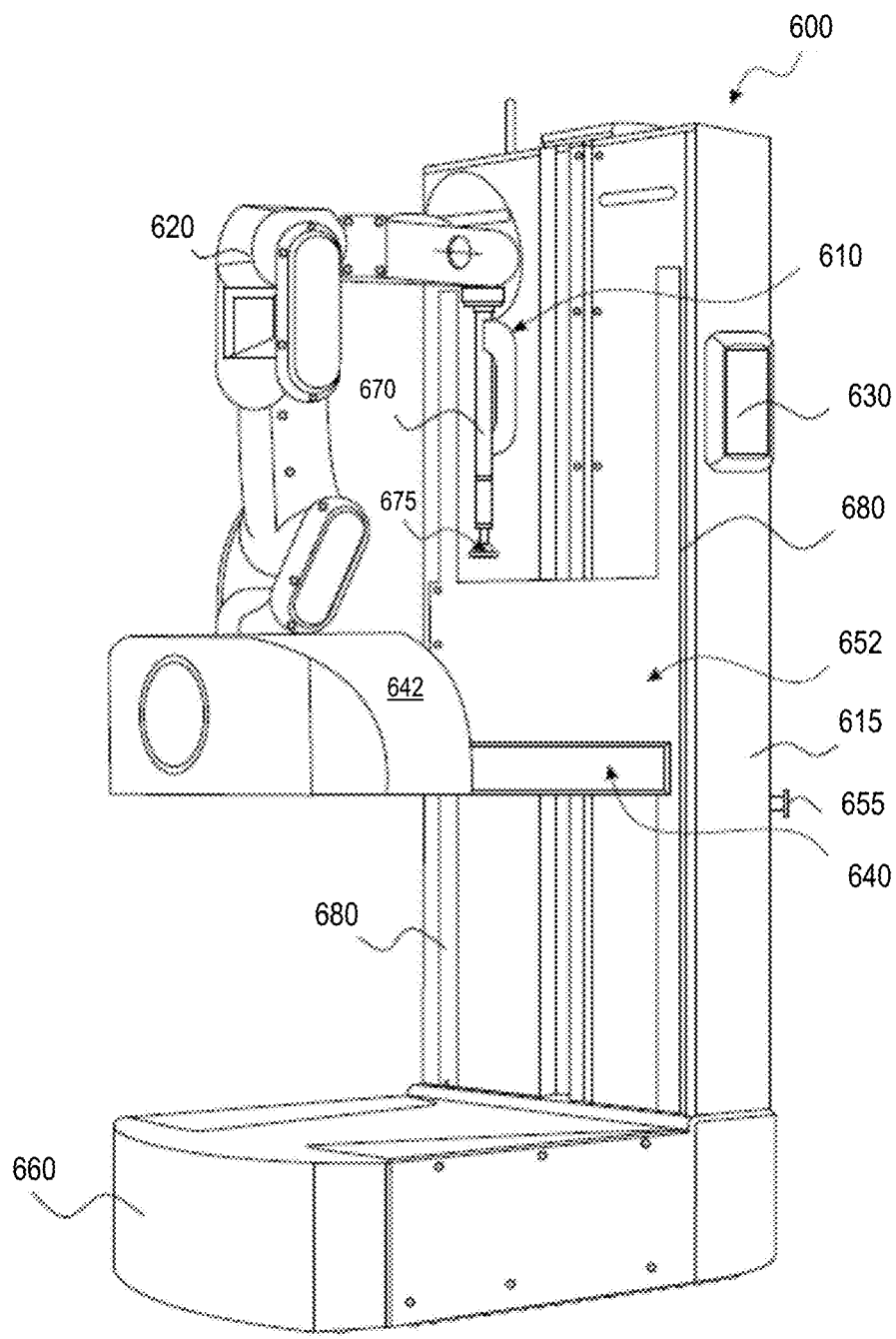

An alternate design for the manipulation robots of the present invention is shown in FIGS. 7A and 7B. The manipulation robot 600 may have a wheeled mobile base 660, a containment area 640, and a manipulator arm 620. Also shown is an exemplary tote 650 on the containment area 640. Further, the manipulation robot 600 may have internal batteries 690, an onboard computer processor 218 with memory storage 216 (see FIG. 2), and a user interface 630. The computer processor and any associated components (memory storage, communication, connections) may be stored in a portion of the manipulation robot 600 protected by an enclosure, such as the main body case 615 of the robot.

The manipulation robot 600 may unload a tote 650 stored on the containment area 640 by first aligning the containment area 640 with the conveyor or another staging area. The manipulator arm 620 may then grasp/move the tote from the containment area 640 and move it to the conveyor or to a transport robot or to the platform. Alternatively, or in addition, the containment area 640 of the manipulation robot may include a conveyance means, such as a conveyor belt or roller bars.

According to certain aspects, the containment area 640 may include more than one level configured to hold a bin or tote 650, wherein at least that portion of the containment area 640 closest to the main body of the robot 600 is configured to hold the multiple totes 650 and to remain stationary with respect to the manipulator arm 620. An adjacent portion of the containment area 640 closest to/connected to the manipulator arm 620 may be vertically moveable with respect to the main body 615 of the manipulation robot 600.

According to such a configuration, the manipulation robot 600 may hold a tote 650 on the mobile portion of the containment area 640 during picking operations, and may move that tote 650 to one of the stationary levels of the platform when the picking operation is complete by aligning the mobile portion of the containment area 640 with the stationary level holding the tote of interest. Transfer may be actuated by the manipulator arm 620 or by a conveyance system on either or both of the stationary/mobile platforms. The manipulation robot 600 may select another empty or partially filled tote 650 (i.e., incomplete pick order) from another of the stationary levels of the platform, align the mobile portion of the containment area 640 with the stationary level holding the tote of interest, transfer that tote/bin to the mobile portion of the containment area 640, and start/continue a different pick order. In this way, the manipulation robot 600 may complete several orders at one time without the need to unload/travel to the staging area or a conveyor.

When the pick operation is completed, the manipulation robot 600 may unload the various totes stored on the different stationary levels by aligning the mobile portion of the containment area 640 with a tote 650 on the stationary portion of the platform. The manipulator arm 620 may grasp/move the tote from the stationary level to the mobile level of the containment area 640. The manipulation robot may then align the mobile portion of the containment area 640 with the conveyor, a transport platform on the transport robot, or another staging area to unload the tote.

Alternatively, these processes may be reversed for item or tote put-away.

Each manipulation robot 600 may also be equipped with safety features which can include: one or more safety lights or strobes 655, an audible warning annunciator or horn, one or more emergency stop buttons, the ability to display fault, error and/or intended action (such as navigation turn signal) information on the user interface 630 or at some other point on the manipulation robot 600, or any combination thereof.

As discussed above, the onboard computer processor 218 may be configured to run a set of programs with algorithms capable of performing navigation and picking. Further, the onboard computer processor 218 may utilize data from sensors to output control signals to the mobile base 660 and manipulator arm 620 for navigation and picking, respectively.

The user interface 630 may include a graphical display monitor and an input device, where the input device may be a touch screen (as shown by 630), a track ball, voice command, a keyboard, input buttons or any combination of these devices and possibly others. As discussed above, the user interface 630 allows a user to command and control each manipulation robot 600 to perform localized tasks and to enter picking dispatch information manually, thus sending the robot on its mission.

A robot manipulator arm 620 may be used in the presently disclosed manipulation robot 600 to pick totes 650 or bins within a logistics facility. As shown in FIGS. 7A and 7B, the manipulator arm 620 may be mounted to the containment area 640 at a position distal from the mobile base 660 of the manipulation robot 600. The vertical reach of the manipulator arm 620 may be extended, for example, by mounting a proximal end of the containment area 640 on a track that may provide vertical motion of the platform with respect to the mobile base 660.

The manipulator arm 620, which is at the distal end portion of the containment area 640, may be mounted on a vertical actuator stage which may raise and lower the manipulator arm 620 relative to the containment area 640. This may provide the clearance necessary to enable the manipulator arm 620 to transfer more than one tote 650 or bin onto the containment area 640, such as stacked one on another, or as detailed above (multiple levels on the transport platform). Further, the articulated segments of the manipulator arm 620 may provide the clearance necessary to enable the manipulator arm 620 to transfer more than one tote 650 or bin onto the containment area 640 without the need or use of a vertical actuator stage.

As discussed above, the manipulation robot 600 may use an end effector 675 on the manipulator arm 620 to pick totes 650 or bins from their stored location and transfer them to the containment area 640. The end effector 675 may be a suction cup, which may be connected to a vacuum pump through an onboard computer processor 218 controlled valve. The vacuum suction at the suction cup may be engaged and disengaged by actuating the valve, thereby allowing the manipulation robot 600 to grasp the desired tote 650 or bin on contact and then release it when necessary.

Alternatively, the end effector 675 may be a mechanically actuated gripper such as, for example, a robotic hand having articulated digits, a simple gripper, an electroadhesion end effector, a magnetic end effector, or combinations thereof, and the robots may comprise an end effector swap mechanism configured to permit a change of the end effector. The manipulation robot 600 may also include an extension tool 670, which may enable the manipulation robot 600 to position the end effector 675 at a sufficient depth into a storage rack so that the end effector may reach a desired tote 650 or bin while maintaining clearance for the manipulator arm.

The containment area 640 of the manipulation robot 600 may comprise a conveyance means such as rollers, which may improve movement of a tote 650 onto the platform or off of the platform. Alternatively, the containment area 640 may comprise a mechanically actuated conveyance device that allows for automatic transfer. The conveyance device may be a small conveyor belt or may be a set of rollers or wheels which is capable of shifting the tote 650 to and from another platform or conveyance.

As discussed above, the manipulation robot 600 may comprise one or more sensors that may be used to aid in at least navigation of the mobile base 660 throughout a logistics facility, movement of the manipulator arm 620 and/or end effector 675 to pick a tote 650 or bin, and detection of obstacles in the travel path of the manipulation robot 600.

At least one sensor may be centrally located on the manipulator arm 620 such that rotation of the arm directs the at least one sensor toward the tote 650 to be picked for identification and localization. Positioned opposite the at least one sensor may be at least one opposite sensor that is mounted such that once the manipulator arm 620 angles itself to pick the tote, the opposite sensor is now aimed directly onto containment area 640. This opposite sensor may provide the data necessary to allow the onboard computer processor 218 (see FIG. 2) to analyze the containment area 640 to find the optimal location to place the tote 650, considering that there might be previous totes already container thereon. Additionally, with two such sensors aimed in opposite directions, the system may be able to pick totes from the left or the right side of the manipulation robot 600.

Further, the containment area 640 may comprise a calibration target which may be viewed by one or more sensors on the manipulator arm 620. As such, information on the calibration target may be used to calibrate these sensors to ensure that all parameters are within specifications, and if not, update the parameters to reflect the current configuration.

Figure 6:
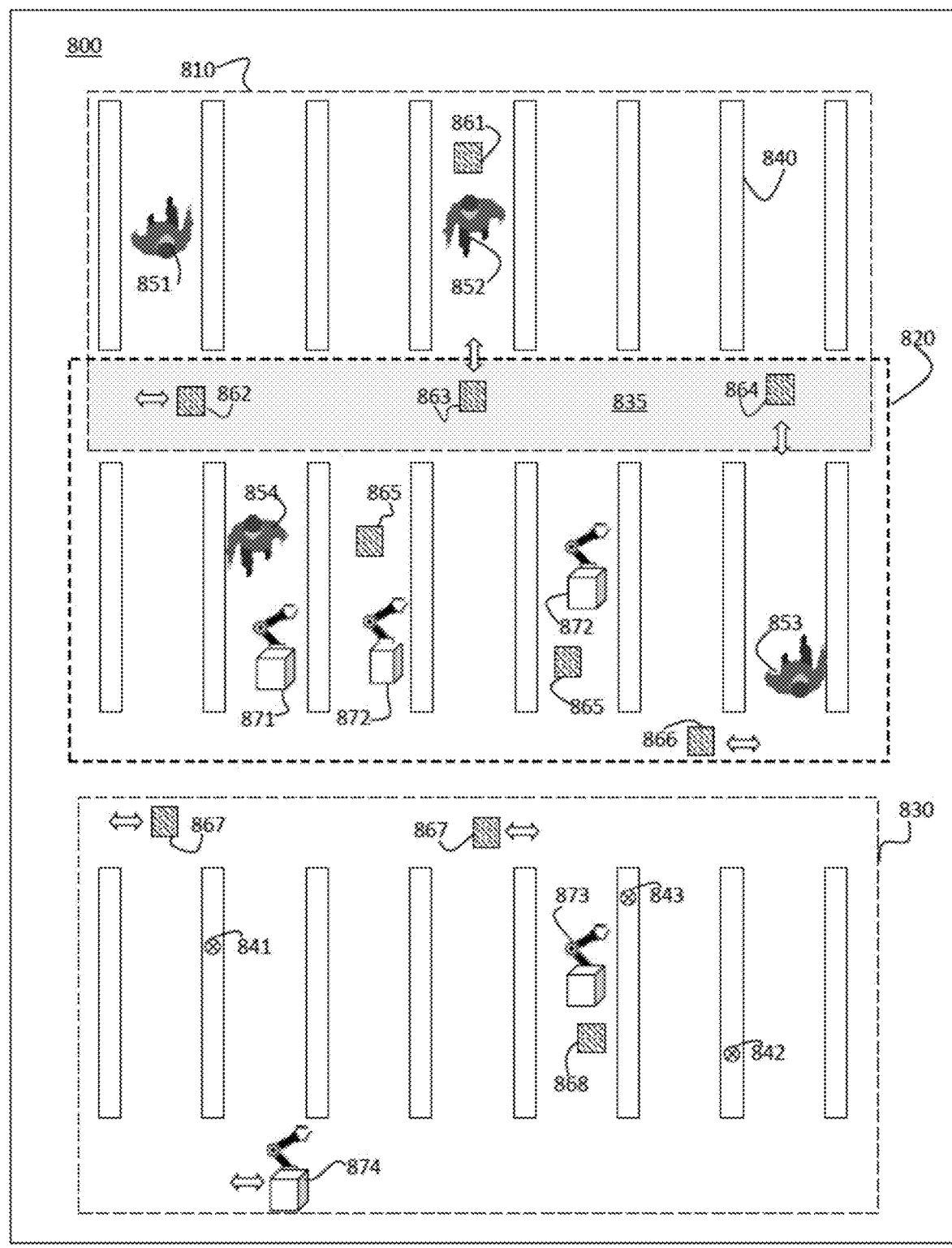
FIG. 6 illustrates a simplified overhead floor plan view of a representative logistics facility in accordance with certain aspects of the presently disclosed invention.

FIG. 6 shows another exemplary floor plan for a section of a logistics facility 800 in which the manipulation robot may be deployed. According to certain aspects of the presently disclosed invention, various work zones may be defined within a logistics facility. For example, a logistics facility 800 may include zones that are robot specific work zones where human workers are excluded 830, zones where humans and robots may work side-by-side 820, and human-only work zones where robots are substantially or totally excluded 810. While shown in FIG. 6 to include entire rows of shelving units 840, these zones may be setup in any user defined manner, such that portions of shelving or storage rows or even individual units may include two or more work zones.

These various work zones may be mapped using granular information, such as 1D bar codes placed on ends of racks, or may be mapped in a more defined manner, such as using identifiers that define specific regions of interest (e.g., individual racks in a row of racks; described in more detail hereinbelow).

Selection of these work zones may be dynamic. That is, the various work zones may be defined/redefined at any point during operation of the system from either the central server 200 or the WMS 201. In certain instances, signals may be communicated to the central server 200 or the WMS 201 regarding a new limitation or definition of the work zones, such as from any of the robots. For example, in the case of a human accident or emergency, it may be necessary to exclude robots from a specific area of a logistics facility. Robots in the area may send information regarding the emergency (i.e., emergency signals initiated by the robot or by a human worker, or sensor information that may be interpreted at a distal location to indicate an emergency).

As shown in zone 830, manipulation robots 874 may pick items, totes, or bins from standard shelving 840 and may transport those picks to a different zone within the logistics facility, such as to a conveyor or a pack/ship zone (see 320 and 360 of FIG. 3). The manipulation robots 873 may pick items, totes, or bins and may transfer those items to a transport robot 868. The transport robot 868 may then travel to a different location to deliver the item. Exemplary locations include a conveyor or a pack/ship zone (see 320 and 360 of FIG. 3). Alternatively, the transport robot 868 may transfer the items to another transport robot 867 for delivery to any of those locations.

The manipulation robots may recognize other robots during operation by a visual or audible code of the transport robot. For example, the transport robot may include a barcode on an outside surface that can be read by the manipulation robot, thus identifying the correct transport robot partner in a transaction (e.g., transfer of item, bin, or tote).

With continued reference to FIG. 6, the systems of the presently disclosed invention may also work side-by-side with human workers in a mixed work zone 820. For example, human workers (853, 854) may pick items and transport those items to a conveyor or a pack/ship zone, or to a transport robot (866, 864), or to a manipulation robot 871. Manipulation robots 872 may also pick items, totes, or bins from standard shelving 840 and may transfer those items to transport robots 865. As indicated above, the transport robots 865 may then travel to a different location, such as a conveyor or a pack/ship zone (see 320 and 360 of FIG. 3) to deliver the items, or may transfer the items to another transport robot (866, 862) for delivery to any of those locations.

Within the same logistics facility, human only work zones 810 may be established where robots are substantially or totally excluded. Human pick workers 851 may select items for transport to a conveyor or a pack/ship zone (see 320 and 360 of FIG. 3). According to certain aspects, transport robots (861, 863) may be allowed in these zones (810) to accept items, totes, or bins from the human workers 852. These transport robots (861, 863) may then travel to a different location, such as a conveyor or a pack/ship zone (see 320 and 360 of FIG. 3) to deliver the items, or may transfer the items to another transport robot 862 for delivery to any of those locations. As shown in FIG. 6, there may be overlap 835 between certain of these zones.

According to certain aspects, mapping of items to a region of interest (e.g., slots on a shelf or rack) may be dynamic. For example, certain items may become more highly requested, and thus localization of those items to additional storage locations, and/or to storage locations closer to pack and ship areas of a logistics facility may enhance picking operations. Thus, according to certain aspects, the identities of items stored at specific regions of interest, as defined by the markers positioned according to the methods disclosed herein, may be dynamic. That is, item identities at regions of interest may be dynamic and may be redefined at any point during operation of the system from either the central server 200 or the WMS 201. In certain instances, signals may be communicated to the central server 200 or the WMS 201 regarding a new limitation or definition of product location, such as from any of the robots (i.e., using SLAM methods as detailed herein). This information may stem from recognition of SKU information on the item or from other characteristics of the item recognized by a manipulation robot (such as other visual characteristics or a weight of the item).

The system's central server 200 may be used to process order information that is transacted with a WMS 201 and may coordinate the fulfillment of orders with a plurality of manipulation robots 100. All computation on the server 200 may be executed by one or more internal processors 220. In certain embodiments, the server may have two software modules that enable this order fulfillment coordination. The first processor may be a task dispatch module 228, which analyzes orders received from a WMS 201, and determines which of the plurality of manipulation robots 100 is to be assigned to an order. After a manipulation robot 100 is selected for picking an order, the task dispatcher 228 instructs the robot 100 with high-level order picking information, such as, route navigation paths, SKU locations, and an order drop-off location. The task dispatcher 228 works closely with a system state monitor 230 to obtain key feedback information from the system. The system state monitor 230 may communicate with the manipulation robots 100 to keep track of their current physical location within the facility, along with status information, which may include but is not limited to: whether the robot 100 is currently assigned an order, any faults or error modes, health information, such as remaining battery power, or charging status.

The central server 200 may also be used to store and process centralized SKU information in an SKU database 256, which stores information required by the robots to complete the order picking. The processing of this SKU specific information is executed within a SKU analysis software module 226. The SKU information can include SKU size and shape data, which can include physical dimensions, 3D geometry that can include point and triangle mesh structures, item weight, appearance information that can include colorized texture maps, and may include SKU marking codes, that can include barcode and UPC data. Additionally, the central server 200 may store information in the SKU database 256 about the locations and regions on the surface of the individual SKU units that are allowed, or not allowed, for grasping by the manipulation robot 100. This allows the manipulation robot 100 to grasp an item in a way that is known to be safe and stable and prevents the robot from grasping an item at a point or in a way that is unsafe or unstable.

According to certain aspects, the SKU information may comprise data collected by the system and methods disclosed in U.S. Pat. No. 10,311,634 titled "Three-dimensional scanning and data extraction systems and processes for supply chain piece automation".

In certain embodiments, the onboard robot storage bed 140 may be configured to sense the weight of the item placed thereon. This information may be communicated to the central server 200 and may provide additional verification that the correct SKU was picked, and that the item was properly transferred to the onboard robot storage bed 140. If the wrong weight is sensed in the storage bed 140, the manipulator arm 120 may be used to remove the item from the storage bed. The item may be replaced to the storage location by the manipulator arm 120, or a signal may be sent to the central server 200 requesting manual assistance, such as from a human pick worker. In the event that no weight is sensed in the storage bed 140, the manipulator arm 120 may be used to select another replacement item and/or retrieve the dropped item. Further, a signal may be sent to the central server 200 requesting manual assistance, such as from a human pick worker, or to alert the system to a change in the SKU inventory.

The central server 200 can also store information about the state of the SKU inventory in the SKU database 256 and may process this information in the SKU analysis module 226. Such information may include the position of items in their stored location, the location and orientation of grasping points for the robot to attempt to pick, and the sequence in which items of the same SKU type and approximate location should be picked from the shelf. This enables a sufficiently fast picking operation for the manipulation robot 100, such that picking geometry and sequencing can be planned and stored in memory 256 on the central server 200 or, and also, on the local storage 216 and does not need to be computed at the time of pick by a given manipulation robot 100. The central server 200 enables multiple manipulation robots 100 to share information about the state of inventory and plans for picking, so that different robots 100 can pick from the same storage location, without each one needing to sense and compute pick information.

Inventory and SKU status information may also be shared with the central server 200 and/or WMS 201 by the manipulation robots, and in some cases by the transport robots (900,

900'). For example, if a certain SKU item is absent, misplaced, or in a position that is not readily retrievable by the manipulation robot, the robot may send this information to the central server 200/WMS 201.

In certain instances, the manipulation robot may encounter a situation wherein the product at the target location (as defined by the central server 200 or the WMS 201) may not match the characteristics of the expected SKU at that location. In such an instance, the manipulation robot may send signals back to the central server 200 and/or WMS 201 indicating an error (i.e., mapping error or stocking error). If the SKU at the location is close in characteristics to the expected SKU, or if the target location includes SKU's having similar characteristics stored side-by-side, the manipulation robot may request clarification from the central server 200 and/or WMS 201, or may request assistance from a human worker. For example, the request may be displayed on a display screen (130, 630) of the manipulation robot (100 and 600, respectively), and the human worker may indicate the correct pick for the robot. Alternatively, the request may be displayed on a remote display screen, and a human may indicate the correct pick for the robot.

In the instance when the manipulation robot is unable to pick an item at a first location, such as when it encounters any of the errors mentioned above (e.g., item missing, wrong item, item position so that manipulator arm can't execute the pick, etc.), a redundant picking method/system may be employed. With reference to FIG. 6, when the manipulation robot encounters an error at a first pick location 841, it may travel to a second pick location 842 and attempt the same pick. Should the manipulation robot encounter an error at this second pick location 842, it may travel to a third pick location 843 and attempt the same pick. This redundant storage of items or totes may improve efficiency and reduce error rates in a pick operation. For example, should the pick accuracy at a single pick location be about 80%, inclusion of at least a second pick location would increase the pick accuracy to about 96%, and inclusion of a third pick location would increase the pick accuracy to about 99.2%. Should the pick accuracy at a single pick location be about 90%, inclusion of at least a second pick location would increase the pick accuracy to about 99%, and inclusion of a third pick location would increase the pick accuracy to about 99.9%. In situations of limited space within the logistics facility, only high traffic items may be stored in multiple pick locations.

The markers for each of these redundant storage locations or slots would not be the same. The central server 200 may store information about the infrastructure of the facility of operation in a map storage database 254. This can include information about the storage racks 310 such as shelving dimensions (width, depth and height), separate shelf level heights, shelf face widths, and rack column widths. The infrastructure information can be created, modified and analyzed through a map creation software module 224 on the central server 200. By using this module a human operator can manually create a facility map or may in some embodiments load the map data from a predefined file, such as a Computer Aided Drawing (CAD) file, or in other embodiments may load mapping data automatically collected by a robot 100, which can use its onboard sensors (150, 110), to observe the facility infrastructure and automatically generate a map.

The manipulation robots may also dynamically upload mapping data automatically collected by their various sensors. That is, the one or more robots may collect image data and utilize simultaneous localization and mapping (SLAM) to generate a map of the logistics facility using the location of various markers (e.g., see 420 in FIG. 4) dispersed throughout the warehouse. SLAM provides real-time construction/updating of a map of an unknown environment while navigating through that environment. Popular SLAM approximate solution methods include particle filter, extended Kalman filter, and GraphSLAM.

The manipulation robots 100 may have a set of sensors (150, 110) that enable autonomous navigation within a facility and sensors 110 that allow it to identify and localize individual SKUs for picking. The sensors (150, 110) may be 3D depth cameras, color cameras, laser ranging devices, or any combination thereof. These sensors (150, 110) in a preferred embodiment provide high resolution 3D point data to the manipulation robot 100 that details the presence of physical objects within their field of view. The sensors (150, 110) may be connected to the onboard computer processor 218, which may process the 3D point and color data to extract information for navigation and picking. In different embodiments, a unique set of sensors mounted on the manipulation robot 100 may be used for picking and for navigation. The manipulation robot may be programmed to point the sensors in a direction that is expected for the task.

In order to perform pick work, the manipulator robots 100 may move and navigate between pick locations in the work zone 330 and an order transfer area 360. During navigation the sensor data may be processed by the onboard computer processor 218 in a navigation software module 212 to extract two modalities of information. The first modality may be local mapping information that indicates which areas around the manipulation robot 100 are traversable and which areas contain obstacles. The ground facing sensors 150 on the manipulation robot 100 are primarily used to generate this mapping information and collision detection information. There may be two ground facing sensors 150, a front-facing one and a rear-facing one. This unique design allows the manipulation robot 100 to navigate while driving both forwards and backwards, which in certain picking scenarios, eliminates the need for the manipulation robot 100 to turn around, thus reducing travel time and increasing picking efficiency.

Figure 4:
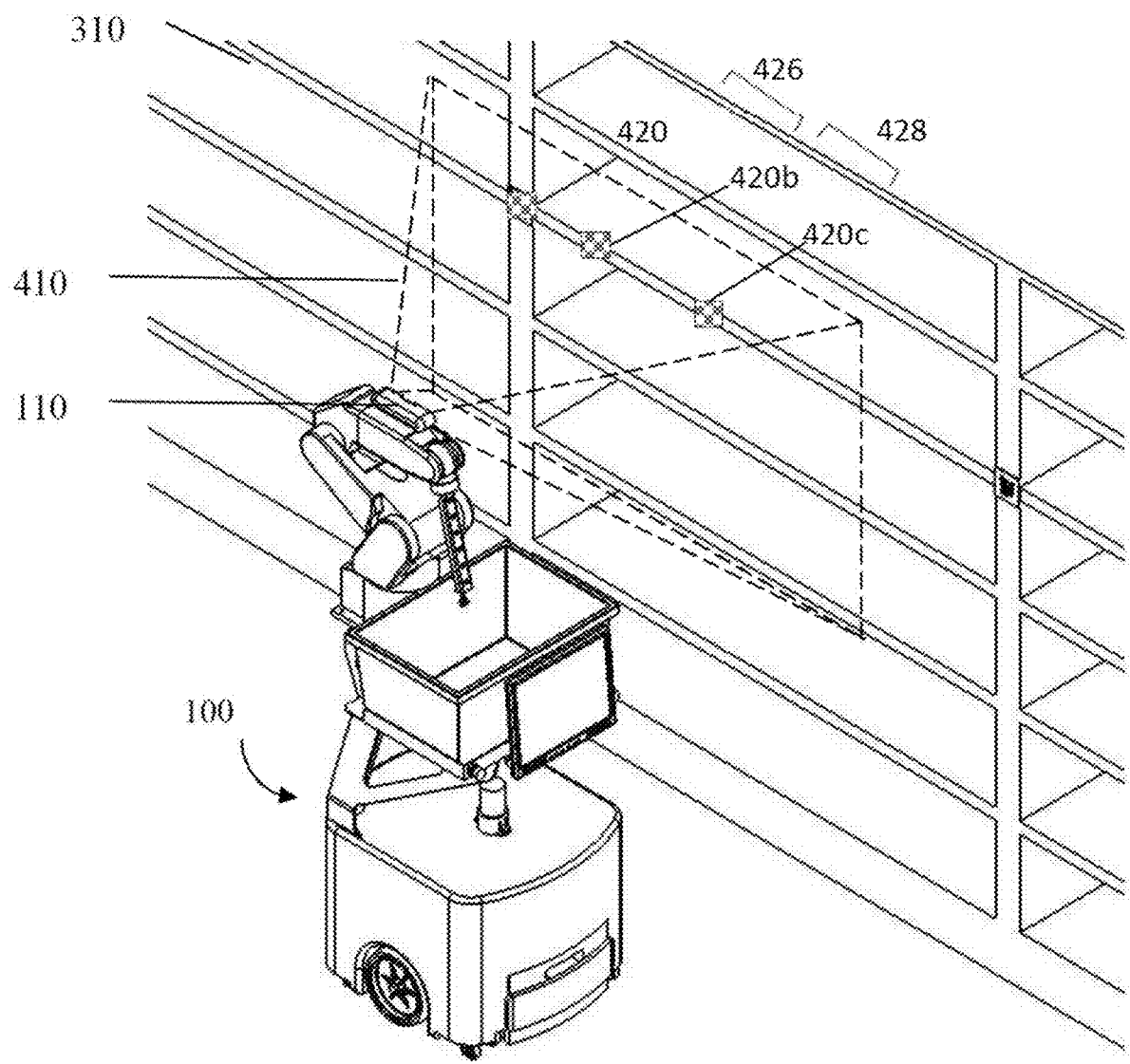
FIG. 4 is a diagram depicting an exemplary embodiment of mobile robot navigation using visual landmark location markers in accordance with certain aspects of the presently disclosed invention.

The sensor data may be processed by the onboard computer processor 218 in a navigation software module 212 to extract visual or audible landmark locations, such as the visual landmark marker 420 locations shown in FIG. 4. According to the presently disclosed invention, the system may use landmarks such as visual markers 420, which may be placed ahead of time in fixed locations around the facility of operation. At least one of the onboard sensors (150, 110) are used to detect these markers 420 and locate the manipulation robot 100 relative to them. This enables the robot 100 to know precisely where it is in the facility. Each marker 420 may have a unique pattern that is different from other markers 420 within the same facility. The unique marker pattern 420 may be recognized by navigation module 212 algorithms which may be run by the onboard computer processor 218, thus allowing the manipulation robot 100 to localize itself without ambiguity.

Exemplary landmarks include visual markers as described above, which may include any identifiable unique visual pattern, such as barcodes, numbers, letters, geometric shapes, or even a specific pattern of blinking lights, and audible markers, which may include at least unique patterns of sound or even specific tones of sound. Before a robot can use landmarks for navigation, the characteristics of the landmarks may be stored on the central server 200, the WMS 201, and/or the storage 216 of the robot. The characteristics of the landmarks are stored on the remote storage 216 of the manipulation robot 100 so that the robot may navigate autonomously through a logistics facility and may not require constant communication from the central server 200 or WMS 201.

Additionally, as depicted in FIG. 4, careful attention is given to the placement of markers 420, which may be vertically mounted on shelving 310. This allows the robot 100 to locate vertically mounted visual markers 420, because they are within the field of view 410 of its arm mounted sensor 110. Vertically mounted markers 420 may be desirable because markers installed on the floor of a facility are more difficult to maintain.

According to certain aspects, the presently disclosed invention provides methods and systems that assist the various robots described herein in finding their way around a logistics facility and identifying the exact locations of specific items, bins, or cases to pick. Accurate execution of such operations is an important component to overall order picking success. As such, methods for robust robot localization, mapping and region of interest segmentation beyond simple navigation markers on inventory shelving or facility flooring are disclosed herein.

In manual or robotic picking areas, logistics facilities usually store their product inventory on racks, which are subdivided into shelves and finally into slots on each shelf. Each slot generally contains a quantity of unique product units, or SKUs. Some facilities have wide product slots. In these cases, the robot can see the complete slot, and simple slot markers (e.g., colored dots) may work adequately for identification. However, other facilities may store their SKUs densely and may therefore have narrow product slots.

As defined herein, a "wide slot" is one in which the extents, i.e., edges, of the slot are not visible in a single camera frame with a robot camera, and a "narrow slot" is one in which the extents of the slot are viewable in the single camera frame. In this latter case, multiple narrow slots may be viewable in a single camera frame.

Further complicating slot identification in these cases are neighboring slots that contain nearly identical products such as vitamin bottles, salad dressing bottles, or cereal boxes. For facilities that have narrow slots, or which store similar items adjacent each other, the robots' overall success will be dictated by their ability to identify the correct slot tag markers. This success generally requires a more robust marker system than the simple solutions currently available.

The present invention utilizes a novel marker system that may be applied on every inventory rack in a logistics facility and may even be used across multiple logistics facilitates. The marker system provides successful picking without having to positively identify the object to be picked.

According to certain aspects, the markers generally serve as visual fiducial markers, which can be used to extract pose and marker signature. Currently available markers use a binary matrix to encode information. An inherent flaw in use of this binary matrix is that it limits the maximum number of markers you can have, and thus the maximum number of items or locations that can be identified in a logistics facility. While increasing the resolution of the marker somewhat mitigates this limitation, the number of possible markers remains finite and generally less than the number required in current day logistics facilities. Such a facility can theoretically contain an infinite set of mapping points, which means that, over a period of time for a sufficiently large facility, the markers will need to repeat.

The present solution to this problem includes generating markers based on the physical location of an individual rack within the logistics facility. Thus, even though the finite number of markers and potentially infinite number of racks means that these markers will still repeat, according to the present solution, the tags only need to be unique in a local span. However, ensuring that a tag is unique locally means maintaining information on neighboring racks. This activity creates a large bookkeeping operation to keep up with neighboring rack data while generating markers for a single rack.

An alternate solution is to compute a continuous periodic function that repeats tags after a preset span. For any minor changes to the racks locally, however, an entire span of racking would have to be recomputed to ensure that the contiguous nature of the tag progression is maintained. With the potentially infinite span of a logistics facility, the problem becomes intractable if there is infinite flexibility in the way racking is arranged. Thus, if marker generation were to be automated, certain constraints would need to be placed on the way the facility could be arranged or rearranged, or on how a robot may operate in such a facility.

This problem can be offset by imposing constraints on the facility to make the problem tractable. Having a general set of assumptions that are valid throughout the facility allows a locally unique set of markers to be computed for each rack without maintaining data on its neighbors. This solution has a two-fold advantage: (1) locally unique markers can be generated as a result of a rack's unique attributes, meaning information on the rack's neighbors is unnecessary and does not have to be maintained; and (2) while picking, the feature vector of markers to be expected at the shelf can be computed using rack information.

The presently disclosed invention solves both issues, where a large cumbersome optimization does not need to be computed, and local changes to racks do not need an entire span of racks to have their markers regenerated to guarantee local uniqueness. This solution also solves the bookkeeping problem, i.e., a database does not need to be maintained for the markers and their location, as they are simply computed on the go.

Accordingly, the presently disclosed invention uses a continuous approach to marker placement that allows locations of discrete markers to be mapped to a continuous periodic function. Rather than associating specific tag identities with rack identities, these marker tags are associated with the location of the slots or areas of interest they represent. As such, the presently disclosed invention comprises three novel ideas: (1) locally unique features, (2) computation of a landmark index based on a periodic function, and (3) the ability to use a finite set of landmarks over an infinite space.

Figure 8:
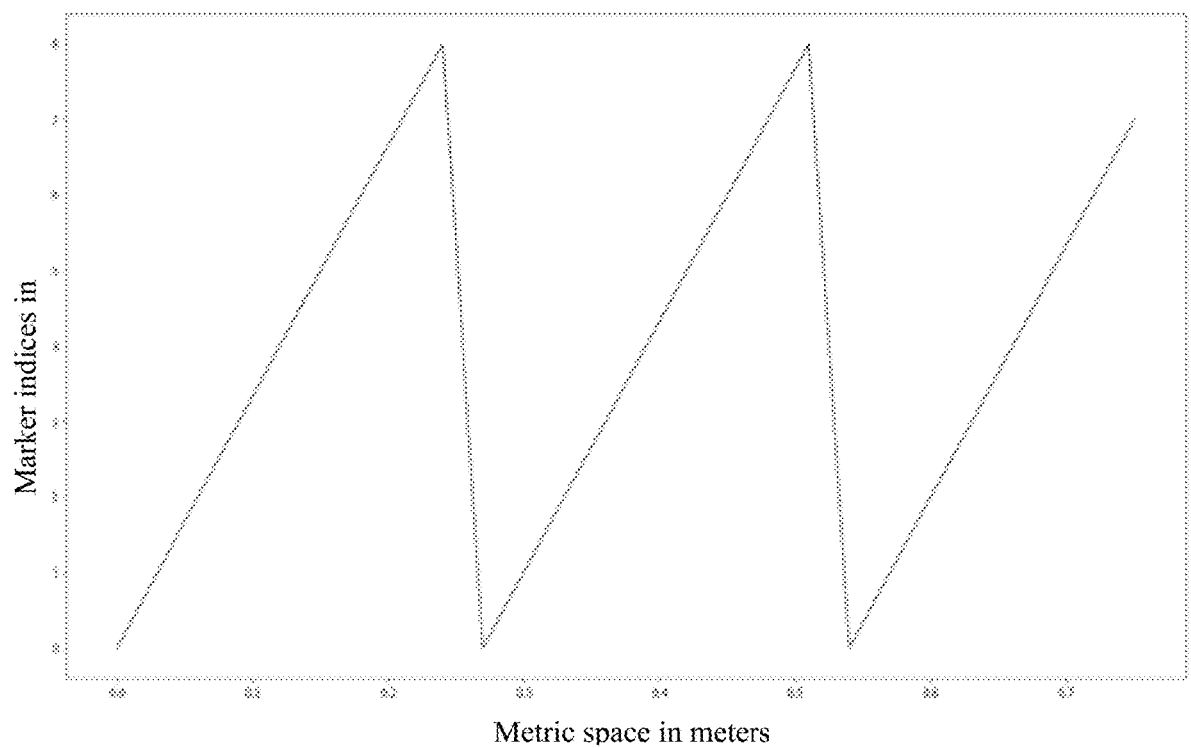
FIG. 8 illustrates an exemplary periodic function used to generate markers in a repeating pattern of integer indices in accordance with certain aspects of the presently disclosed invention.

This novel approach uses a periodic function that has the width of one marker in metric space as the minimum resolution. An exemplary periodic function is shown in FIG. 8 wherein the marker index in shown on the Y-axis (integers) mapped to metric space on the X-axis (meters). Moreover, the unique function shown in FIG. 20 differentiates a unique physical position (x-axis) for each marker value (y-axis). This method produces markers in a repeating pattern of integer indices for an infinitely long axis in the metric space. Therefore, every slot on a rack maps its metric position to the corresponding marker and has a locally unique marker index.

Figure 9:
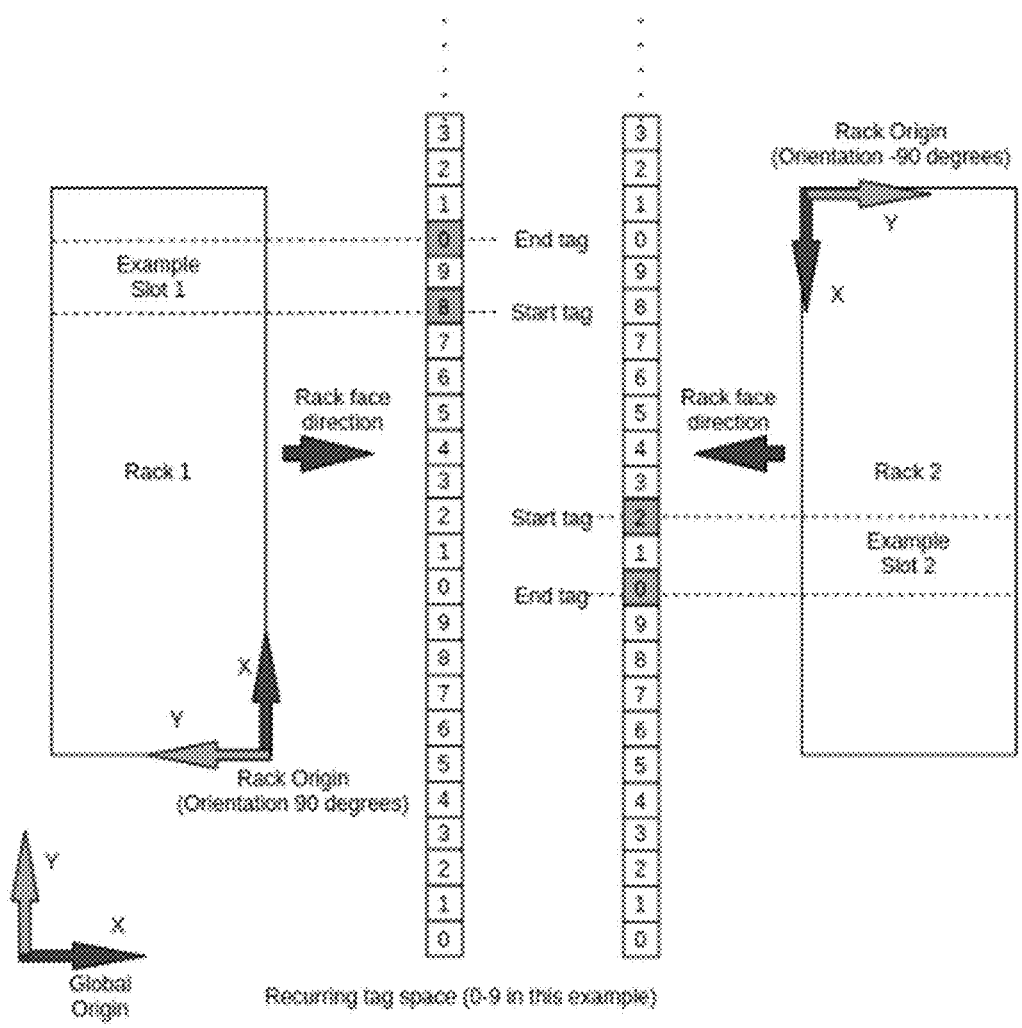
FIG. 9 illustrates an exemplary distribution of locally unique fiducial markers on racks in accordance with certain aspects of the presently disclosed invention.

With reference to FIG. 9, an example of how the presently disclosed method may distribute locally unique markers on racks using a recurring tag space of 0 to 9 is shown. Individual markers are positioned at each side of a slot or region of interest. Thus, adjacent slots may share a single marker therebetween. Such an arrangement increases the number of markers that may be positioned on a shelf, which may be especially useful for closely spaced items or narrow slots. Moreover, the robots that use the presently disclosed systems and methods may be configured to understand a vertical position of the sensors that detect these markers. As such, a z axis location for the marker may be understood by the robot (i.e., from a position of the onboard sensors). As such, the methods of the present invention may use the markers with the same pattern within a single rack as long as they are located at different vertical (z-axis) positions, e.g., at different shelf heights.

This method allows for multimodal localization using the markers positioned at slots or regions of interest. Further, it allows for implicit global localization for probabilistic beliefs, as a repeating pattern for any marker would be far enough from the current state to be not considered as an update to the multimodal belief. It also allows for the robot to update its belief on where the markers themselves are actually located in a full simultaneous localization and mapping (SLAM) application, i.e., in instances when the marker has been physically placed in the wrong location (either relatively on the shelf, the whole rack, or both).

According to certain aspects, individual racks in a logistics facility may also include a marker that may uniquely identify a rack and/or rack location within the logistics facility. The markers placed on the racks may be different from the markers placed on the shelves, as described above. For example, according to certain aspects, each rack in a logistics facility may include a unique 1D barcode positioned at an end thereof. Further, the 1D barcodes may be positioned vertically so that the information may be accurately scanned by sensors of a passing robot. Alternatively, or additionally, these markers may be positioned on the floor or at other locations within such a facility (e.g., support beams, doorways, walls) that may provide granular orientation information that is differentiated over the more precise location information provided by the set of markers placed using the presently disclosed periodic function.

Accordingly, these additional markers may aide in a granular definition or mapping of the logistics facility. Once at a specific rack or granular location within the facility, the markers disclosed herein may provide the fine mapping to accurately locate and identify a slot or region of interest on the rack.

This invention addresses several challenges associated with localization, mapping, and region of interest segmentation, which include the ability to positively identify a region of interest (e.g. a slot) to find an item of interest using smaller markers detectable by low-resolution cameras. These markers provide localization to and positive identification of the region of interest by guaranteeing local uniqueness of landmarks in a 1-D manifold of 3-D space of potentially infinite span (i.e., marker location calculated based in a periodic function).

The unique localization of markers at the region of interest allows mapping of a finite set of landmarks to an infinite space. Moreover, localization of the markers based on a periodic function allows onboard computation of expected landmarks as opposed to maintaining a lookup table of markers to locations in space, and ready identification of missing or mispositioned markers.

The identity of these identifiers may be determined by onboard processors of the robot, such as any of the robots disclosed herein, or by processors of a remote server such as the WMS 201 or the central server 200. These identities may be used to calculate or understand a pose of the robot within a 3D space. Sensor data from any of the robots disclosed herein may be processed by the onboard computer processor 218 in a navigation software module 212 to extract visual or audible landmark locations, such as the visual landmark markers 420, 420b, and 420c locations shown in FIG. 4. According to the presently disclosed invention, the system may use fiducial markers 420, which are be placed ahead of time in fixed locations based on the methods of the presently disclosed invention. At least one of the onboard sensors may be used to detect these markers 420 and locate the robot relative to them. This enables the robot to know precisely where it is in the facility.

Each marker 420 may have a unique pattern that is different from other markers 420 within the same facility. The unique marker pattern 420 may be recognized by navigation module 212 algorithms which may be run by the onboard computer processor 218, thus allowing the manipulation robot to localize itself without ambiguity As shown in FIG. 4, a region of interest (426) may be defined by the placement of markers 420 and 420b at edges of the region of interest. A second adjacent region of interest (428) may be defined by placement of markers 420b and 420c at the edges thereof, wherein a single marker may be shared between regions of interest (i.e., marker 420b).

Exemplary markers will comprise any identifiable unique pattern, such visual fiducial markers (2D and 3D barcodes, QR codes, data matric, ArUco codes, or even a specific pattern of blinking lights), RFID, and audible markers (patterns of sound or even specific tones of sound). Before a robot can use markers for navigation, the characteristics of the markers may be stored on the central server 200 or on the remote storage 216 of the manipulation robot. When the characteristics of the markers are stored on the remote storage 216 of the robots, they may navigate autonomously through a logistics facility and may not require constant communication from the central server 200.

According to certain aspects, the remote server such as the WMS 201 or the central server 200 may be configured to invalidate pose information sent from a robot and may enforce a different pose via an external message. According to certain other aspects of the systems and methods, a human user may be able to enforce a different pose for a specific robot, such as via interaction at a user interface of the robot (display screen, USB port, etc.).

The central server 200 and/or WMS 201 may also be used to store and process centralized information about the markers and their initial mapped locations within the logistics facility, in a marker database. The location within the logistics facility generally comprises a set of x, y, and z coordinates. For example, the x,y coordinates provide a position in logistics facility of a rack and z position provides the height of a shelf on the rack. The processing of this information may be executed within a marker analysis software module.

Inventory and SKU status, as well as pose information for markers may also be shared with the central server 200 and/or WMS 201 by the manipulation robots and transport robots. For example, if a certain SKU item is absent, misplaced, or in a position that is not readily retrievable by the AMMR, the robot may send this information to the central server 200/WMS 201. As another example, if a marker is missing or mispositioned, the robot may send this information to the central server 200/WMS 201. Such information, either alone or in combination, may allow the robot to proceed to a second pick location that may house the item of interest, or place that second location on a route itinerary. Alternatively, the robot may signal for assistance from a human worker, such as through signals on the robot or via communication with the central server 200 and/or WMS 201. For example, the request may be displayed on a display screen 130 of the manipulation robot 100, and the human worker may indicate the correct pick for the manipulation robot 100. Alternatively, the request may be displayed on a remote display screen, and a human may indicate the correct pick for the manipulation robot 100.

In addition to onboard sensors (150, 110) and navigation software 212, the navigation process may also be aided by a remote server such as the WMS 201 or the central server 200. The remote server may have access to the central facility map storage 254, which enables it to analyze the stored maps in depth and optimize routes between pick locations. As such, for example, the central server 200 has a set of route planning algorithms in a software module 222 that allow it to pre-compute navigation routes within the robot work zone 330, and between the work zone 330 and any transfer areas 360. These routes can be stored after computation in a route storage database 252 within the central server 200, so that they can quickly be recalled and communicated to manipulation robots 100, for rapid response during order fulfillment and for interchangeability between multiple robots 100.

To perform individual item picks, onboard sensors (150, 110) may be used to detect and localize individual items along with the specific locations and orientations of the grasp points 501 on the surface of an item. FIGS. 5A and 5B illustrate top and front views, respectively, of items stored on a shelf in a logistics facility. As shown, the manipulation robot 100 may use its end effector 175 and optionally an extension tool 170 to grasp an item at a specific point and orientation 501. During a pick, the sensors 110 also locate the infrastructure around the items such as shelving levels 500, rack columns, shelf faces and signage. This geometry information for the infrastructure is required for pick manipulation algorithms in a manipulation software module 214 to determine a pick trajectory that is collision free, such that the manipulation robot 100 is able to grasp the item without colliding with surrounding objects.

In a preferred embodiment, special attention has been given to the placement of the picking perception sensors 110, which are mounted on the manipulator arm 120 in an orientation that allows them to see the pick location while the end effector 175 is positioned above the storage bed 140, as is shown in FIG. 1B. This method enables the system to localize additional pick items, grasp positions and orientations after a pick has been made and an item is being placed into the storage bed 140. This picking geometry information can be stored in memory 256, on the central server 200, or, and also, on the local storage 216 where it can be recalled later to enable sufficiently fast picks of the same SKU the next time it is required. Additionally, it is common for more than a single item of a particular SKU to be picked for an order. In this case, the perception and localization computation of additional pick items can be done at the same time the manipulator arm 120 is placing a previous pick in the storage bed 140, which may help to improve the speed and efficiency of picking multiple items which are in near proximity.

In some embodiments, an additional "fine tuning" sensor may be added to the robot near the end effector tool 175 to help accurately perform a pick grasp. After the picking sensor 110 positively identifies and localizes a pick point, there may still be some positioning error present due to uncertainty in accuracy and calibration of the sensor 110. Therefore, a tuning sensor may be mounted at the tip of the end effector tool 175 on the robot 100 to more precisely locate the position of the tool 175 relative to the desired pick location. The tuning sensor would have the desired pick location in its field of view as the robot is attempting the pick grasp. As the manipulator arm 120 moves towards the desired pick location, the tuning sensor could be used to make small adjustments that guide the tool 175 toward the desired point.

The manipulator robots 100 have a mobile base 160 that is controlled by the onboard computer processor 218. The mobile base may have two main drive wheels 167, each driven by a servo motor. Each drive wheel 167 may have an encoder that provides motion feedback, which is used to precisely control the speed of each wheel in order to achieve the desired rotation and translation velocities of the robot 100. The feedback data is also used for odometry to estimate the motion of the robot 100 relative to the facility. The odometry is responsible for guiding the robot 100 navigation at times when visual markers 420 are out of sensor (150, 110) range. The mobile base 160 may also use passive wheels, such as casters 165, for stability and weight distribution.

All systems onboard the manipulator robot 100 may be powered from onboard batteries 190, which may be housed within the mobile base 160. The batteries 190 may supply power to the robot during navigation and picking for a limited time and may be rechargeable to maintain operation through an economically viable work period. Battery charging may occur opportunistically during times at which no orders are present for the manipulation robot 100 to pick, or charging may occur separately from the manipulation robot 100. In this later case, the batteries 190 may be swapped with separately charged batteries for continued operation of the robot 100.

For opportunistic charging, the manipulation robot 100 may have a charging station in a designated area of the facility 340 in which the robot 100 can make temporary electrical contacts which feed power into the onboard batteries 190 while the robot 100 is present. For separate charging, a battery hot-swap may be performed by using permanently installed smaller short-life (minutes) onboard batteries to maintain power while a larger modular battery 190 is replaced with a fully charged battery 190 of equivalent design. This prevents the manipulation robot 100 from needing to power down during battery swap, which saves time. Hot-swapping may be done manually by a human operator, or may be done automatically by internal mechanisms of the manipulation robot 100 and charging station being used to physically swap batteries 190 while the robot 100 coordinates the procedure.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

What is claimed is:

1. A method for executing an order fulfillment operation within a logistics facility, the method comprising:
receiving at a remote server via a server communication interface at least one order including at least one item to be picked;
generating at the remote server a task list based on the at least one order, wherein the task list includes a unique identification for the at least one item, and a first location within the logistics facility for the at least one item;

sending, from the remote server via the server communication interface, the task list to a server of a manipulation robot;

moving the manipulation robot autonomously along a route within the logistics facility to a first location for the at least one item, and picking the at least one item from the first location using an arm of the manipulation robot, wherein at least one sensor on the manipulation robot provides signals related to detection, identification, and location of the at least one item to be picked, and one or more processors of the server of the manipulation robot analyze the signals to generate arm control signals to guide an end effector of the arm to pick the at least one item with a collision free path throughout a controlled motion of the arm, wherein the task further includes a second location within the logistics facility for the at least one item, and in the event that picking the at least one item from the first location is not successful, the method further includes:

moving the manipulation robot autonomously along the route within the logistics facility to the second location and picking the at least one item from the second location using an arm of the manipulation robot.

2. The method of claim 1, wherein the task list generated on the remote server may include dynamically defined work zone perimeters, wherein the work zones include robot only work zones, human only work zones, and shared work zones.

3. The method of claim 1, wherein the work zone perimeters may be updated at any time during an order fulfillment operation.

4. The method of claim 1, wherein the task list further includes instructions displayed on a user interface screen of the manipulation robot, wherein the displayed instructions include directions intended for a human worker in the logistics facility.

5. The method of claim 1, wherein the first location of the at least one item further includes a position of a human worker.

6. The method of claim 1, wherein the task further includes a third location within the logistics facility for the at least one item, and in the event that picking the at least one item from the first and second locations is not successful, the method further includes:

moving the manipulation robot autonomously along the route within the logistics facility to the third location and picking the at least one item from the third location using an arm of the manipulation robot.

7. The method of claim 1, wherein the task list further includes a location and orientation of grasping points on the at least one item for the end effector of the arm to use for grasping the at least one item.

8. A method for executing an order fulfillment operation within a logistics facility, the method comprising:

receiving at a remote server via a server communication interface at least one order including at least one item to be picked;

generating at the remote server a task list based on the at least one order, wherein the task list includes a unique identification for the at least one item, and a first location within the logistics facility for the at least one item;

sending, from the remote server via the server communication interface, the task list to a server of a manipulation robot;

moving the manipulation robot autonomously along a route within the logistics facility to a first location for the at least one item, and picking the at least one item from the first location using an arm of the manipulation robot, wherein at least one sensor on the manipulation robot provides signals related to detection, identification, and location of the at least one item to be picked, and one or more processors of the server of the manipulation robot analyze the signals to generate arm control signals to guide an end effector of the arm to pick the at least one item with a collision free path throughout a controlled motion of the arm, wherein the task list includes a unique identification for the at least one item, and the first location within the logistics facility for the at least one item includes an identity of a shelf defined by a shelf marker and an identity of a region of interest on the shelf defined by two fiducial markers positioned at horizontal edges of the region of interest.

9. The method of claim 8, wherein the shelf marker comprises a vertically positioned barcode.

10. The method of claim 8, wherein the fiducial markers comprise a 2D code.

11. A method for autonomous robot navigation and region of interest localization, the method comprising:

receiving data captured by a sensor coupled to a robotic device during navigation of the robotic device;

analyzing the received data to detect at least one identifier corresponding to a region of interest;

for each detected identifier: using the data to determine a current pose of the robotic device within a logistics facility; and generating a navigation instruction for navigation of the robotic device to a location of an item, the navigation instruction based on the current pose of the robotic device and a location of a region of interest at which the item is located, wherein the at least one identifier comprises two fiducial markers positioned at horizontal edges of the region of interest.

12. The method of claim 11, wherein each of the two fiducial markers comprise 2D codes.

13. The method of claim 11, wherein the at least one identifier comprises: a first fiducial marker that defines an x and y coordinate of a storage rack within the logistics facility, and at least one second fiducial marker that defines an x, y, and z coordinate on the storage rack of the region of interest.

14. The method of claim 13, wherein the first fiducial marker comprises a vertically oriented 1D barcode, and the at least one second fiducial marker comprises two markers, each of the two markers positioned at a horizontal edge of the region of interest, wherein the second fiducials markers are 2D-code markers.

* * * * *